United States Patent [19]

Wasilewski et al.

[11] Patent Number: 5,400,401
[45] Date of Patent: *Mar. 21, 1995

[54] SYSTEM AND METHOD FOR TRANSMITTING A PLURALITY OF DIGITAL SERVICES

[75] Inventors: Anthony J. Wasilewski, Alpharetta, Ga.; Keith Lucas, New Market, Canada

[73] Assignee: Scientific Atlanta, Inc., Atlanta, Ga.

[*] Notice: The portion of the term of this patent subsequent to Jun. 7, 2011 has been disclaimed.

[21] Appl. No.: 968,846

[22] Filed: Oct. 30, 1992

[51] Int. Cl.⁶ .............................................. H04K 1/02
[52] U.S. Cl. .......................................... 380/9; 380/20
[58] Field of Search ...................... 380/10, 21, 20, 48, 380/49, 50; 370/79, 82, 84

[56] References Cited

U.S. PATENT DOCUMENTS

| | | | |
|---|---|---|---|
| 4,723,283 | 2/1988 | Nagasawa et al. | 380/20 |
| 4,742,543 | 5/1988 | Frederiksen | 380/9 |
| 4,763,357 | 8/1988 | Barr | 380/48 |
| 4,787,085 | 11/1988 | Suto et al. | 370/110.1 |
| 4,829,569 | 5/1989 | Seth-Smith et al. | 380/10 |
| 4,866,770 | 9/1989 | Seth-Smith et al. | 380/20 |
| 4,890,321 | 12/1989 | Seth-Smith et al. | 380/20 |
| 5,026,105 | 10/1991 | McKnight et al. | 370/84 |
| 5,091,936 | 2/1992 | Katznelson et al. | 380/19 |
| 5,319,707 | 6/1994 | Wasilewski et al. | 380/10 X |

Primary Examiner—Tod R. Swann
Attorney, Agent, or Firm—Woodcock Washburn Kurtz Mackiewicz & Norris

[57] ABSTRACT

A plurality of digital services are carried in a multiplex data stream to a plurality of remote locations. The multiplex data stream comprises a continuous sequence of frames. Each frame comprises two consecutive fields, and each field comprises a plurality of lines. A first group of the lines in each field defines a transport layer region of that field, and a second group of the lines defines a service data region. Portions of the service data region of each field are allocated to respective ones of the video services in proportion to respective data rates of each service. A multiplex control packet is generated for each field that specifies, for each service, which portion of the service data region is allocated to that service. The multiplex control packet for each field is inserted into the transport layer region of that field along with a plurality of other packets that contain system related information. A multiplex map is generated and inserted in the first line of the transport layer of each field that specifies the number and location of packets within the transport layer. A multiplex map is transmitted with each field, and therefore, the number and location of packets within the transport layer may be dynamically adjusted on a per field basis. Additionally, the service allocation within the service data region of each field may be altered on a per frame basis to support statistical multiplexing.

52 Claims, 22 Drawing Sheets

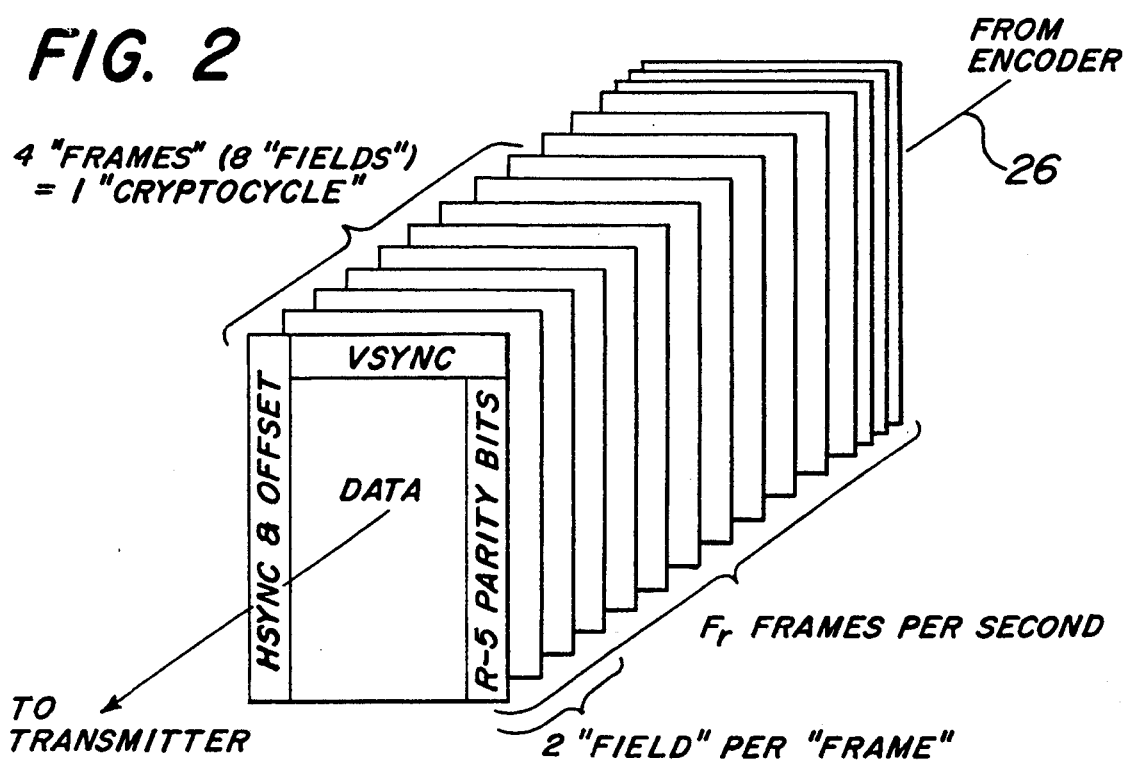
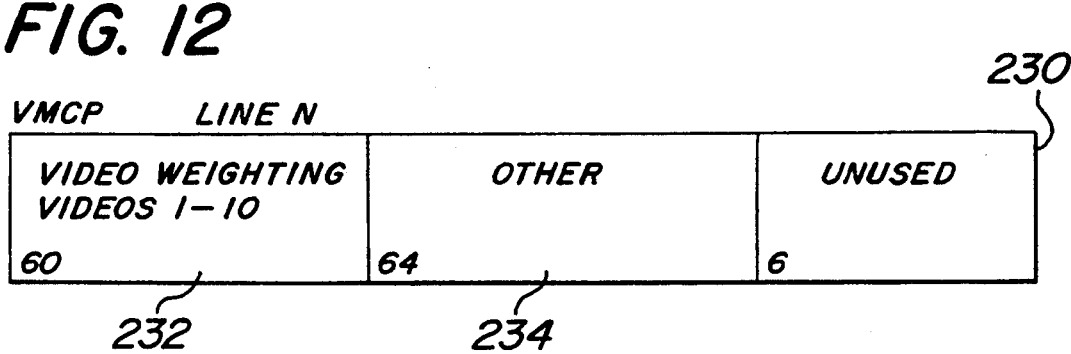
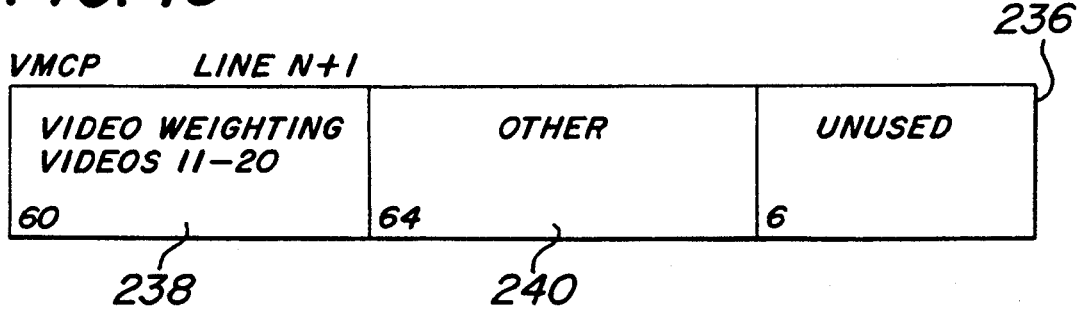

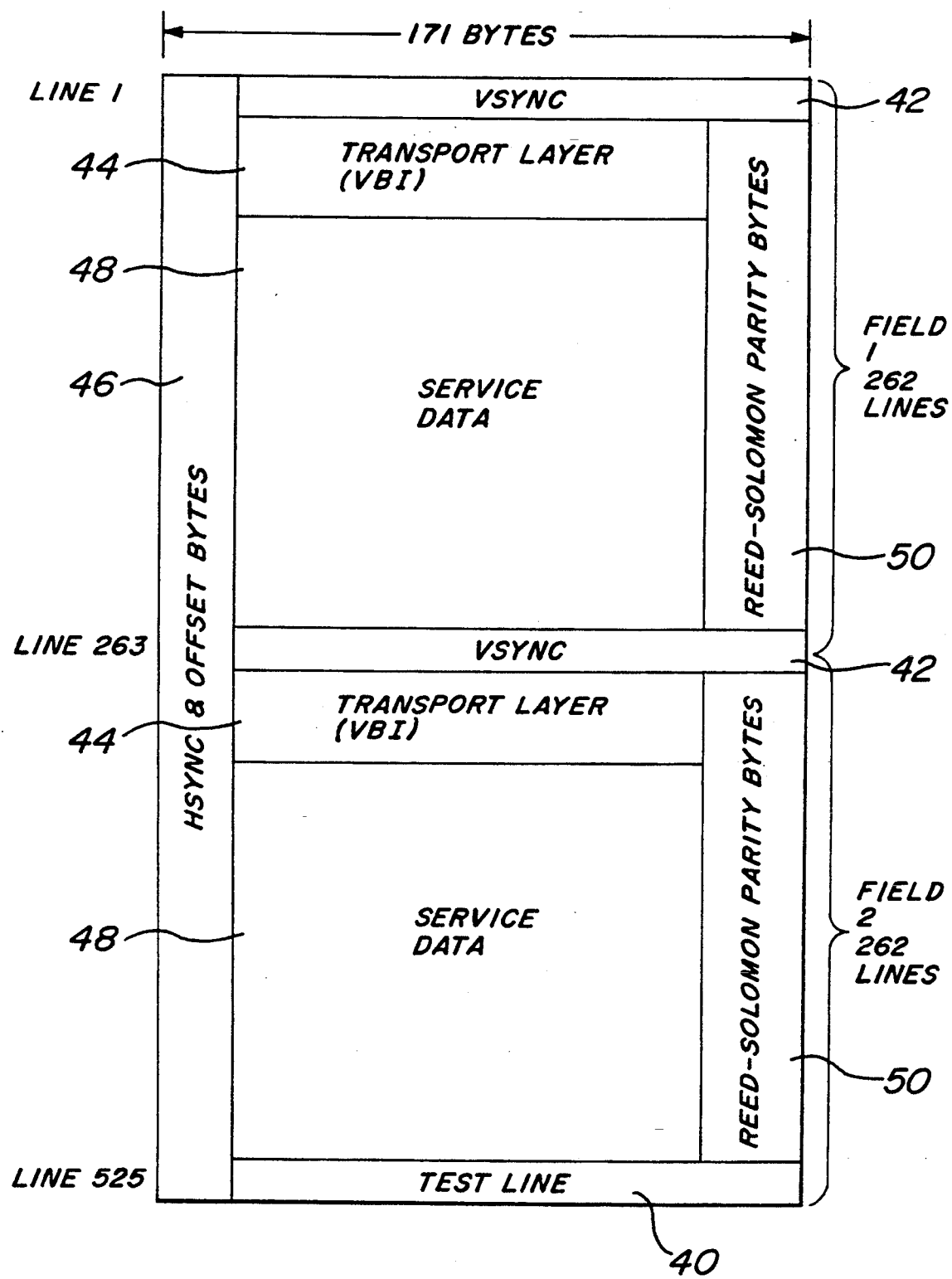

FIG. 6

| LINE | | 4 BYTES | 4 BYTES | 4 BYTES | 4 BYTES | 4 BYTES | 1 BYTE |
|---|---|---|---|---|---|---|---|
| 13 | H S Y N C | CH 1-4 | CH 5-8 | CH 9-12 | CH 13-16 | CH 17-20 | 1 |
| 14 | O F F S E T | CH 2-5 | CH 6-9 | CH 10-13 | CH 14-17 | CH 18-20,1 | 2 |
| 15 | U T I L I T Y | CH 3-6 | CH 7-10 | CH 11-14 | CH 15-18 | 19,20,1,2 | 3 |
| 32 | D A T A | CH 20,1-3 | CH 4-7 | CH 8-11 | CH 12-15 | CH 16-19 | 20 |
| 262 | | CH 10-13 | CH 14-17 | CH 18-20,1 | CH 2-5 | CH 6-9 | 10 |
| | | | | VSYNC | | | |
| 275 | | CH 11-14 | CH 15-18 | 19,20,1,2 | CH 3-6 | CH 7-10 | 11 |
| 276 | | CH 12-15 | CH 16-19 | CH 20,1-3 | CH 4-7 | CH 8-11 | 12 |
| 277 | | CH 13-16 | CH 17-20 | CH 1-4 | CH 5-8 | CH 9-12 | 13 |
| 524 | | CH 20,1-3 | CH 4-7 | CH 8-11 | CH 12-15 | CH 16-19 | 20 |
| | | | | TEST | | | |

(20 CHANNELS)

FIG. 7

| LINE | | | 4 BYTES | 4 BYTES | 4 BYTES | 4 BYTES | 1 BYTE |
|---|---|---|---|---|---|---|---|
| 13 | HSYNC | OFFSET | CH 1-4 | CH 5-8 | CH 9-12 | CH 13-16 | 1 |
| 14 | | | CH 2-5 | CH 6-9 | CH 10-13 | CH 14-16,1 | 2 |
| 15 | | DATA ENTITY | CH 3-6 | CH 7-10 | CH 11-14 | 15,16,1,2 | 3 |
| 28 | | | CH 16,1-3 | CH 4-7 | CH 8-11 | CH 12-15 | 16 |
| 29 | | | CH 1-4 | CH 5-8 | CH 9-12 | CH 13-16 | |
| 32 | | | CH 1-4 | CH 5-8 | CH 9-12 | CH 13-16 | |
| 33 | | | CH 1-4 | CH 5-8 | CH 9-12 | CH 13-16 | 1 |
| 262 | | | CH 10-13 | CH 14-16,1 | CH 2-5 | CH 6-9 | 10 |
| | | | | VSYNC | | | |
| 275 | | | CH 11-14 | 15,16,1,2 | CH 3-6 | CH 7-10 | 11 |
| 276 | | | CH 12-15 | CH 16,1-3 | CH 4-7 | CH 8-11 | 12 |
| 277 | | | CH 13-16 | CH 1-4 | CH 5-8 | CH 9-12 | 13 |
| 524 | | | CH 1-4 | CH 5-8 | CH 9-12 | CH 13-16 | |
| | | | | TEST | | | |

(16 CHANNELS)

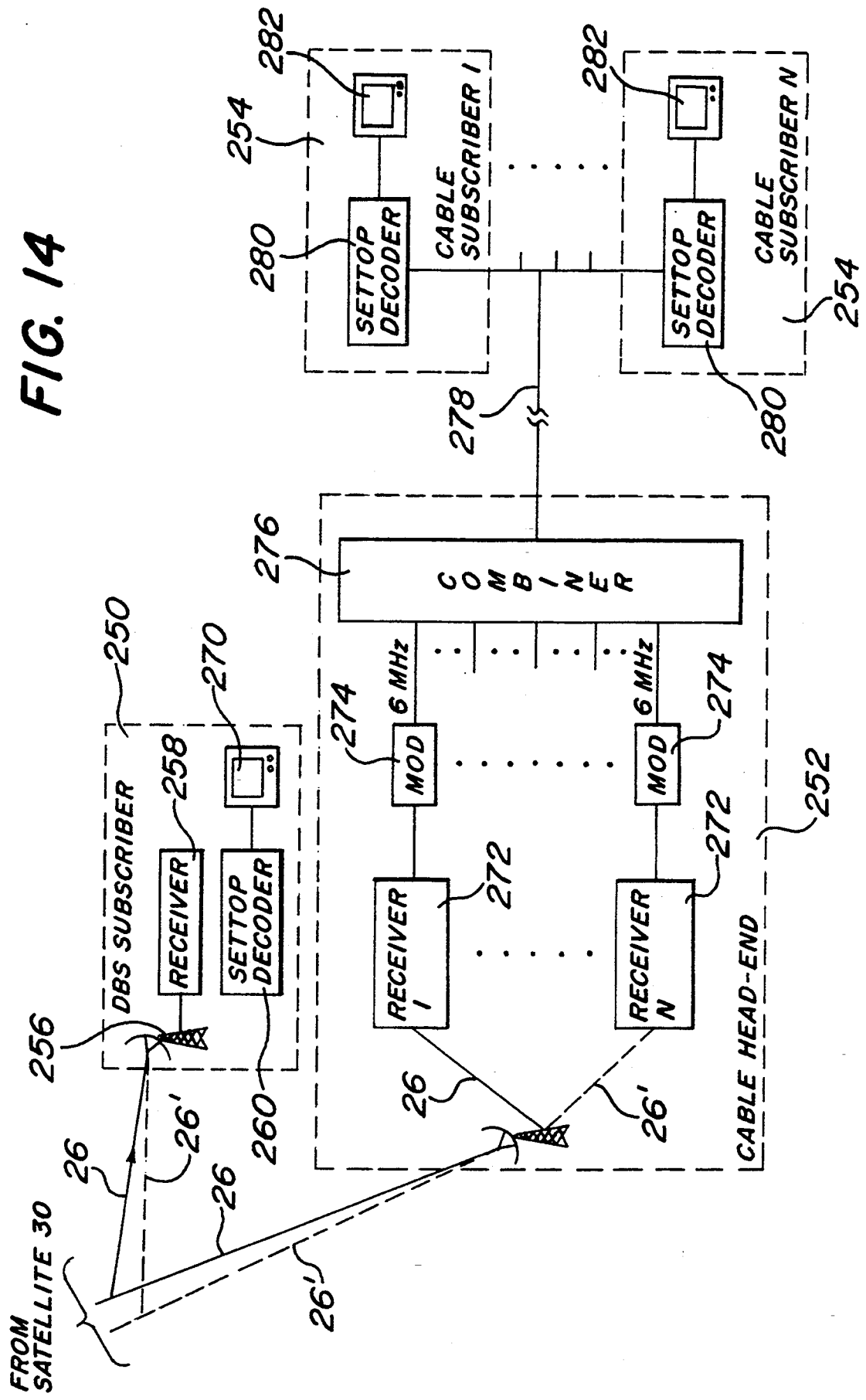

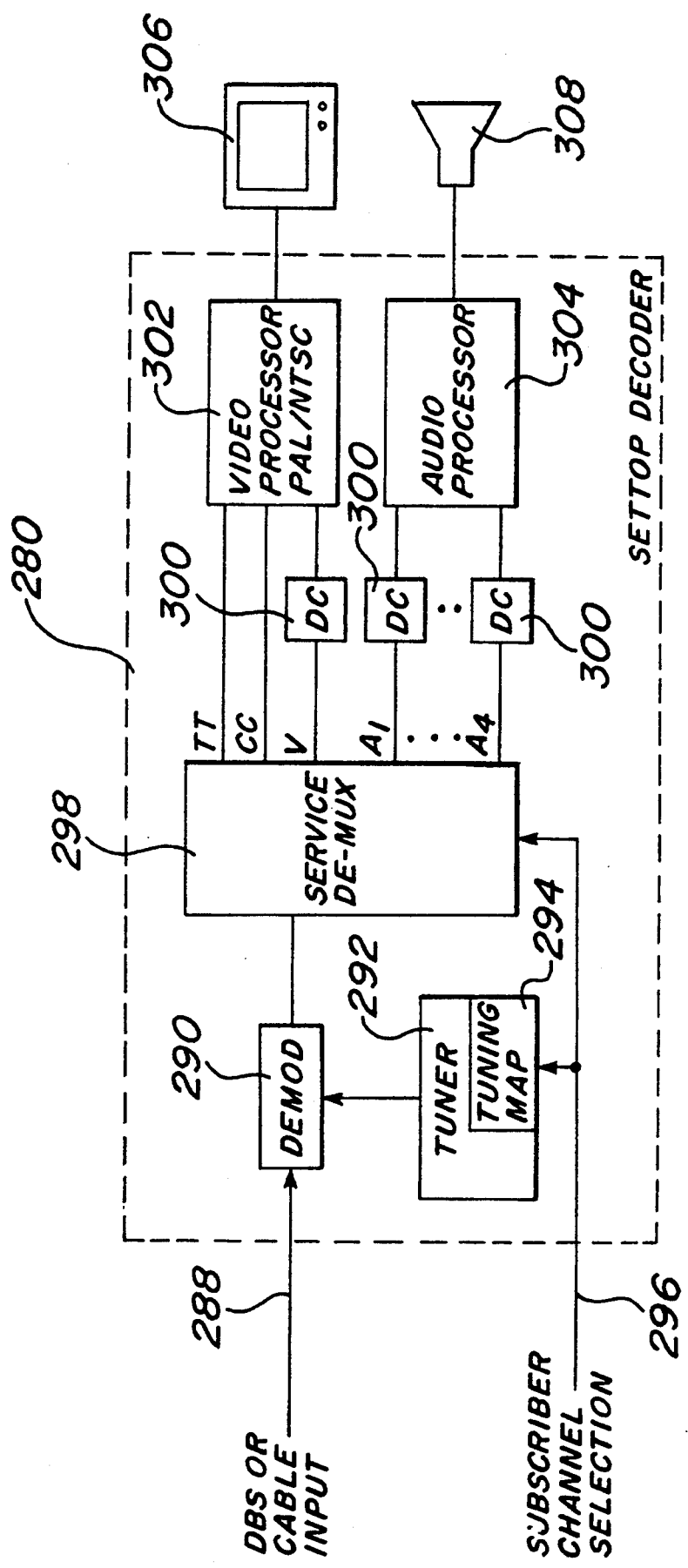

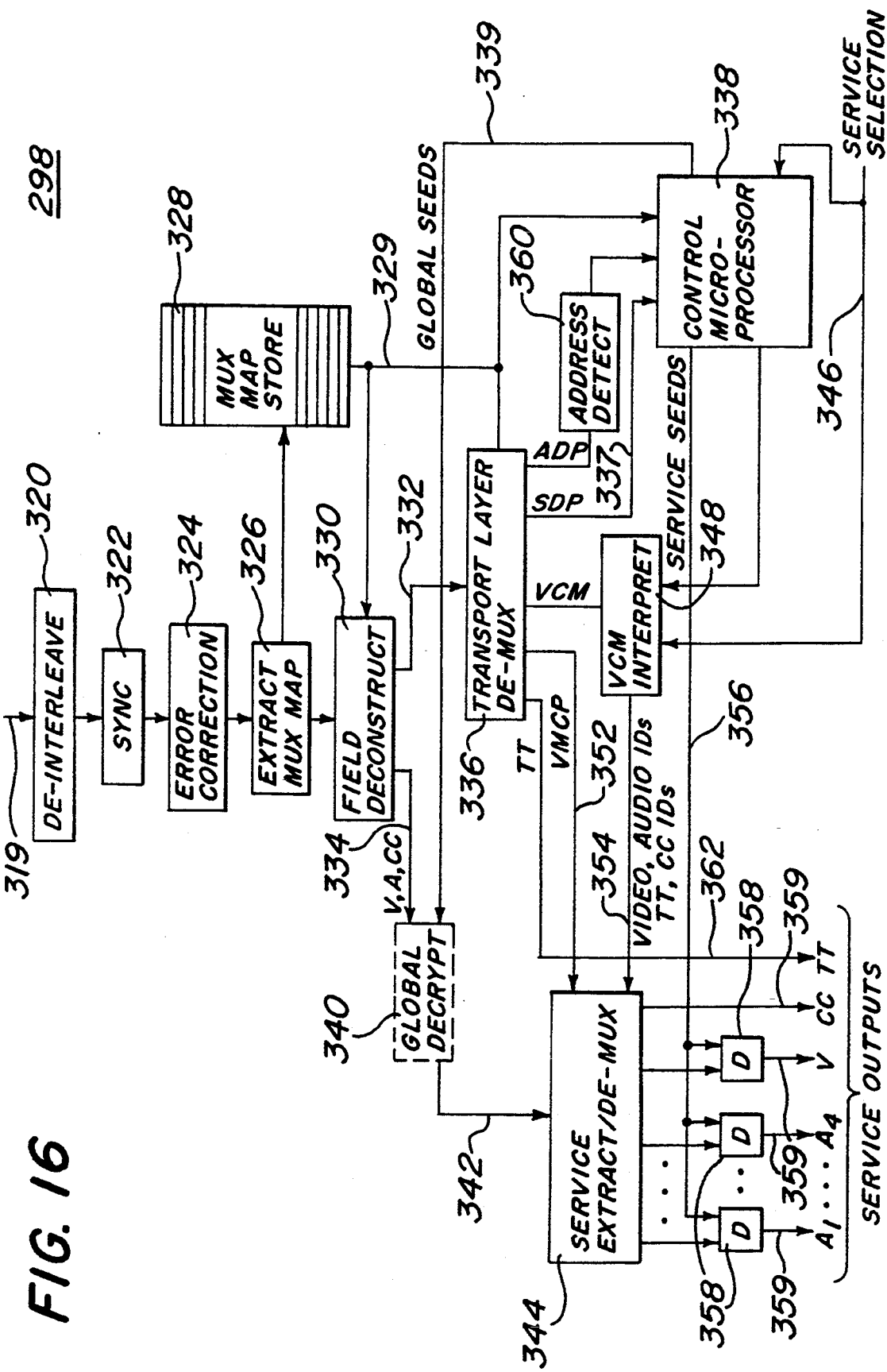

| LINE \ FIELD | 1 | 2 | 3 | 4 | 5 | 6 | 7 | 8 |
|---|---|---|---|---|---|---|---|---|
| 2 | SDP (MUX MAP) | SDP (MUX MAP) | SDP (MUX MAP) | SDP (MUX MAP) | SDP (MUX MAP) | SDP (MUX MAP) | SDP (MUX MAP) | SDP (MUX MAP) |
| 3 | VMCP | VMCP | SDP (SEEDS) | VMCP | VMCP | VMCP | VMCP | VMCP |
| 4 | VMCP | VMCP | SDP (SEEDS) | VMCP | VMCP | VMCP | VMCP | VMCP |
| 5 | VCM | VCM | SDP (SEEDS) | TT | TT | TT | TT | TT |
| 6 | VCM | VCM | SDP (SEEDS) | TT | TT | TT | TT | TT |
| 7 | VCM | VCM | SDP (SEEDS) | TT | TT | TT | TT | TT |
| 8 | VCM | VCM | SDP (SEEDS) | TT | TT | TT | TT | TT |
| 9 | VCM | VCM | SDP (SEEDS) | TT | TT | TT | TT | TT |
| 10 | VCM | VCM | SDP (SEEDS) | TT | TT | TT | TT | TT |
| 11 | ADP | ADP | VMCP | ADP | ADP | ADP | ADP | ADP |
| 12 | ADP | ADP | VMCP | ADP | ADP | ADP | ADP | ADP |
| 13 | ADP | ADP | ADP | ADP | ADP | ADP | ADP | ADP |

FIG. 23

SYSTEM AND METHOD FOR TRANSMITTING A PLURALITY OF DIGITAL SERVICES

FIELD OF THE INVENTION

The present invention relates generally to digital signal transmission, and more particularly, to a system for and method of multiplexing a plurality of digital services for transmission to a plurality of remote locations.

BACKGROUND OF THE INVENTION

The background of the present invention is described herein in the context of subscription television systems, such as cable television and direct broadcast satellite (DBS) systems, that distribute a variety of program services to subscribers, but the invention is by no means limited thereto except as expressly set forth in the accompanying claims.

In the subscription television industry, "programmers" produce "programs" for distribution to various remote locations. A "program" may consist of video, audio and other related services, such as closed-captioning and teletext services. A single programmer may wish to supply many programs and services. Typically, a programmer will supply these services via satellite to individual subscribers (i.e., DBS subscribers) and/or cable television operators. In the case of cable television operators, the services transmitted via satellite are received at the operator's "cable head-end" installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite downlink from the programmers directly.

In the past, subscription television systems, including cable and DBS systems, have operated in the analog domain. Recently, however, the subscription television industry has begun to move toward all digital systems wherein prior to transmission, all analog signals are converted to digital signals. Digital signal transmission offers the advantage that digital data can be processed at both the transmission and reception ends to improve picture quality. In addition, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore, digital compression is extremely advantageous.

Several problems and concerns arise when one considers an all digital program services delivery system. First, there are a wide range of digital service rates in use throughout the industry. For example, digital video service rates differ from digital audio service rates. Digital video rates themselves can range from 17 Mbps (High Definition Television—HDTV) to as low as 1.544 Mbps (telecommunications standard T1). A problem arises when a source programmer wants to transmit multiple digital services having different data rates. There is a need, therefore, for a system that can accommodate different service data rates.

Second, many digital compression algorithms produce a single compressed data stream that has a dynamically varying data rate. Most often this occurs because certain portions of the original data are redundant and the compression algorithm need only transmit a small amount of data to represent those redundant portions. For example, in a sequence of video frames, the "scene" may not change significantly from frame to frame. Rather than transmit a redundant frame, a short code can be transmitted in its place indicating that the frame is substantially the same as the previously transmitted frame. During a typical television program, there are periods where scenes change rapidly (e.g., during an action sequence) and periods where scenes are relatively constant (e.g., during an interview). Consequently, the rate of compressed data will vary dynamically throughout the program. When multiplexing a plurality of compressed digital video services into a single multiplexed data stream having a fixed overall data rate, it is desirable to dynamically allocate portions of the overall data stream to the various video services depending on the individual data rate of each service at given times. This method of dynamic allocation is know as statistical multiplexing. Statistical multiplexing ensures a more efficient use of system bandwidth. Because video and audio compression will be used widely in the subscription television industry, it is desirable for any method of transmitting multiple compressed services to support statistical multiplexing.

Another problem that arises in the subscription television industry context is that system requirements differ from programmer-to-programmer and cable operator-to-cable operator. Also, the requirements of individual programmers and cable operators change over time. For example, a programmer may initially determine that it wants to provide five video services. Later, that programmer may want to expand its offerings and provide additional video services. Having to replace system hardware, however, is undesirable. A system that allows programmers and cable operators to expand the number and type of services they provide without major hardware changes or upgrades is desirable.

The present invention provides a system and method of transmitting multiple digital services, including video, audio, closed-captioning and teletext services, that satisfies the needs described above.

SUMMARY OF THE INVENTION

Briefly stated, the present invention is directed to a method and system for multiplexing a plurality of digital services for transmission to a plurality of remote locations. According to the invention, digital services to be transmitted are provided to an encoder that generates a multiplex data stream which carries the services to the remote locations via a transmission medium, such as a satellite or a cable distribution network. The multiplex data stream generated by the encoder comprises a continuous sequence of frames. Each frame comprises two fields, and each field comprises a plurality of lines. The first group of the lines of each field defines a transport layer region of that field, and a second group of the lines defines a service data region. In accordance with the method of the present invention, portions of the service data region of each field are allocated to respective ones of the digital services in proportion to respective data rates of each service. A multiplex control packet is generated that specifies which portion of the service data region is allocated to each service. The multiplex control packet, is inserted into the transport layer region of each field. In addition to the multiplex control packet, a plurality of system data packets containing other system related information are also inserted into the transport layer region of each field.

In accordance with an important feature of the present invention, a multiplex map is generated that specifies at least the size of the transport layer region and the location of individual packets within the transport layer region. With the multiplex map, therefore, the contents and arrangement of the packets within the transport layer may be dynamically varied on a per field basis.

The multiplex data stream generated by the encoder is then transmitted to a plurality of remote locations. Each of the remote locations is provided with a decoder for receiving a multiplex data stream and extracting selected services therefrom. Video services, for example, may be extracted from the multiplex data stream and displayed on a display device at the remote location. In greater detail, the decoder receives successive fields of the multiplex data stream and, for each field, extracts the multiplex map from the field to determine the content of the transport layer region of that field. With the multiplex map, the decoder is able to extract the system data packets and the multiplex control packet from the transport layer region. In response to a user service selection, the decoder examines the multiplex control packet for each field to determine which portion of the service data region of that field is allocated to the selected service. Once the correct portion has been identified, the decoder is able to extract the selected service data from that field.

In accordance with another aspect of the present invention, the overall data transmission rate of a multiplex data stream is related to the frequency of an analog video format used to produce analog video signals for display at a remote location. In particular, the lines of each field of the multiplex data stream are transmitted at a rate equal to the horizontal line frequency of the particular analog video format being used at the remote locations. In the case of NTSC, for example, the lines of each field of the multiplex data stream are transmitted at a rate of 15.743 kHz. In addition, the number of lines in a frame of the multiplex data stream is equal to the number of lines in a corresponding frame of the analog video format being employed at the remote locations. In the case of NTSC, for example, the number of lines in a frame is 525. When PAL video is being employed at the remote locations, the number of lines in each frame of the multiplex data stream is 625.

Further details and features of the present invention will become evident hereinafter.

BRIEF DESCRIPTION OF THE DRAWINGS

The foregoing summary, as well as the following detailed description, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 2 is a graphical illustration of the multiplex data stream generated by each encoder of FIG. 1 in accordance with the method of the present invention, and explains certain nomenclature used for understanding the system of the present invention;

FIG. 3 shows in detail the general arrangement and contents of a frame of the multiplex data stream of FIG. 2 for transmitting NTSC video services in accordance with the present invention;

FIG. 6 illustrates the arrangement and content of the audio service portion of each field when twenty (20) audio services are carried in the multiplex data stream;

FIG. 7 illustrates the arrangement and content of the audio service portion of each field when sixteen (16) audio services are carried in the multiplex data stream;

FIGS. 12 and 13 show in detail the general arrangement and contents of first and second video multiplex control packets that may be transmitted on consecutive lines of each field of the multiplex data stream;

FIG. 14 is a block diagram of another part of the system of the present invention showing one embodiment of a cable head-end installation;

FIG. 15 is a block diagram of a set-top decoder for receiving a multiplex data stream and extracting selected services therefrom in accordance with the present invention;

FIG. 16 is a block diagram showing details of the service demultiplexers of FIG. 15;

FIG. 23 illustrates the contents of the first thirteen lines of eight consecutive fields (i.e., one nominal "crypto-cycle") transmitted in accordance with the present invention;

DETAILED DESCRIPTION OF THE DRAWINGS

Figure 1:
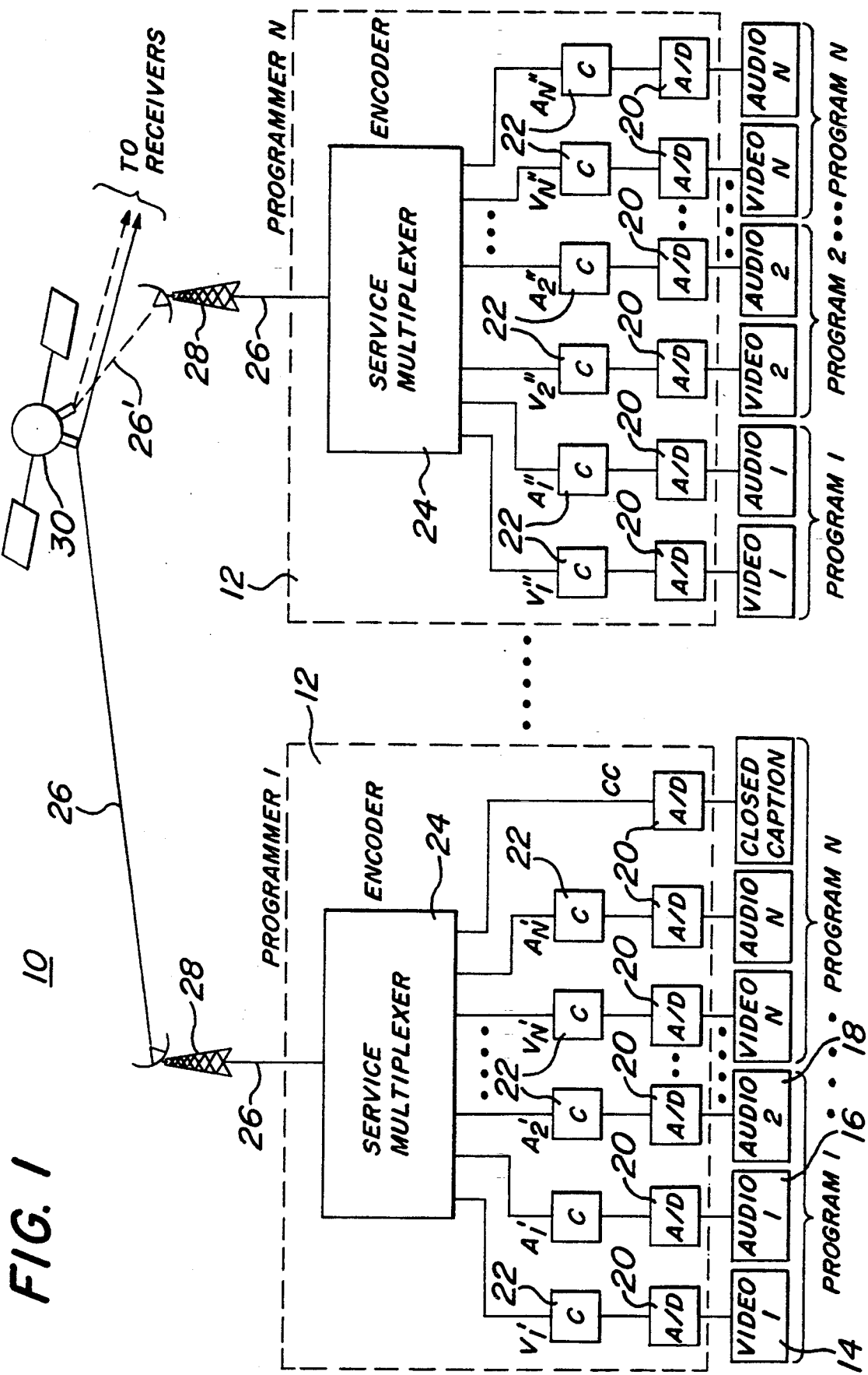
FIG. 1 shows a partial block diagram of a system for multiplexing a plurality of digital services for transmission to a plurality of remote locations in accordance with the present invention.

In the drawings, like numerals indicate like elements throughout. As with the Background of the Invention, the following detailed description is presented in the context of subscription television systems, such as cable television and direct broadcast satellite (DBS) systems, that distribute a variety of program services to subscribers, but the invention is by no means limited thereto except as expressly set forth in the accompanying claims.

FIG. 1 shows a partial block diagram of a system 10 for multiplexing a plurality of digital services for transmission to a plurality of remote locations (not shown). In the subscription television context, the system 10 comprises a plurality of service encoders 12 each of which is operated by a "programmer." As illustrated, any number N of programmers may be present in the system 10. As mentioned in the background, programmers are entities that provide "programs" for distribution to various subscribers. For example, as shown in FIG. 1, programmer1 may provide programs1 . . . N. Each program comprises a set of related services, such as video, audio and closed-captioning services. By way of example, FIG. 1 shows that programmer1 is providing program1 which comprises a video service 14 and two related audio services 16, 18. A given program can comprise a collection of related services, and a programmer may provide any number of programs.

Typically, the individual services of each program are produced in an analog format. According to the system and method of the present invention, each encoder 12 has a plurality of analog-to-digital converters 20 for converting services in analog form to digital services. In addition, video and audio services may be compressed by video and audio compression devices 22, however, compression is not required. As those skilled in the art know, there are many video and audio compression techniques available. For example, the Motion Pictures Expert Group (MPEG) has developed a video compression algorithm that is widely used in the digital video services industry. Vector quantization is another, more recent compression technique for digital video. According to the present invention, any compression algorithm may be employed by the video and audio compression devices 22, and the devices 22 are by no means limited to any one compression method. Furthermore, as mentioned above, compression of audio and video services is not required. Compression merely serves to increase the amount of data that can be transmitted within a given bandwidth.

Each encoder further comprises a service multiplexer 24. As described hereinafter in greater detail, the service multiplexers 24 function in accordance with the method of the present invention to multiplex the individual digital services for transmission to remote locations (not shown), such as a cable head-end installation or DBS subscriber. The service multiplexer 24 in each encoder 12 generates a multiplex data stream which is fed to a transmitter 28 for transmission to the remote locations via a satellite 30. As illustrated in FIG. 1, each programmer (e.g., programmer1 . . . programmerN) provides its own multiplex data stream 26. As described hereinafter in greater detail, the multiplex data streams may be received at various remote locations, such as a cable head-end, a DBS subscriber or a cable subscriber. Each remote location employs a service demultiplexer which extracts selected services from the multiplex stream in accordance with the method of the present invention. Further details of the service demultiplexer will be provided hereinafter.

FIG. 2 is a graphical illustration of the multiplex data stream 26 generated by each service multiplexer 24 in each encoder 12. According to the present invention, the multiplex data stream 26 comprises a continuous sequence of "frames." Each frame consists of two "fields" as shown. As described hereinafter in greater detail, each field contains multiplexed service data and a "transport layer" that contains certain "system data" necessary for operating the system of the present invention. Because certain types of system data are too numerous to transmit in a single field, these types of data are transmitted over a series of fields referred to herein as a "cryptocycle." According to the present embodiment, a cryptocycle nominally comprises eight (8) fields; however, a cryptocycle can be defined by any number of fields. Essentially, cryptocycles define fixed boundaries in the multiplex data stream 26 within which a complete set of system and encryption related data is transmitted. As described hereinafter, the service demultiplexer at each remote location needs all the system data in a given cryptocycle in order to extract selected services from the service data contained in the next cryptocycle.

As explained above in connection with FIG. 1, the video services carried in a multiplex data stream typically originate as analog video signals (except for HDTV signals), and as shown in FIG. 1, the analog video signals are "digitized" by analog-to-digital converters 20 and thus become "digital services." As described hereinafter in greater detail, at subscriber locations, selected digital video services are extracted from the multiplex data stream for viewing on a display device, such as a television, for example. Prior to viewing, however, the digital video services must be converted back to their analog form. As those skilled in the art know, there are several analog video signal formats widely used in the television industries. The NTSC format is widely used in the United States, whereas the PAL format is used in most of Europe. In order to simplify hardware design and frequency generation throughout the system 10, the overall frame structure and transmission rate of the multiplex data stream 26 are related to, and depend upon, the particular analog video format of the video services being carried in the multiplex. The frame structure and digital transmission rate of the multiplex differ depending upon whether the video services carried in the multiplex are PAL video signals or NTSC video signals. Providing digital multiplex data rates and clocks that are related to key analog video frequencies simplifies hardware design throughout the system. In particular, the regeneration of analog video (as well as audio) signals at subscriber locations is greatly simplified.

FIG. 3 shows the general arrangement and contents of a frame of the multiplex data stream of FIG. 2 when the video services carried in the multiplex are based on the NTSC video signal format. The frame structure and transmission rate of the multiplex data stream are related to their analog NTSC counterparts. As described below in greater detail, for example, the overall data rate of the multiplex data stream is related to the analog television line frequency $F_h$, which in the case of NTSC video signals is 15.734 kHz (i.e., $F_h$=15.734 kHz). As illustrated in FIG. 3, a frame comprises a plurality of lines each of which are 171 bytes long (i.e., 1368 bits). In the present embodiment, wherein the video services carried are NTSC format signals, the frame has 525 lines. As those skilled in the art will recognize, the 525 lines of the frame correspond to the number of lines in an analog NTSC picture. Additionally, each frame consists of two "fields," each of which contains 262 lines. A test line 40 is added to the second field to achieve the 525 line total. As those skilled in the art will further recognize, this two-field structure is analogous to the two-field format of NTSC signals.

To achieve correspondence between the multiplex data rate and analog NTSC frequencies, each line of the frame is transmitted at a frequency equal to $F_h$, the horizontal line frequency. In the case of NTSC video, $F_h$ is 15.734 kHz. Thus, when NTSC video services are carried in the multiplex, the multiplex data rate is:

$$\frac{171 \text{ bytes}}{\text{line}} \times \frac{8 \text{ bits}}{\text{byte}} \times F_h = 1368 \times F_h$$
$$= 1368 \times 15.734 \text{ kHz}$$
$$= 21.5 \text{ Mbps}$$

As expected, with 525 lines, the overall frame rate is 29.97 Hz which is equal to the analog frame rate of NTSC video signals. As those skilled in the art will recognize, the multiplex rate of 1368 $F_h$ does not exactly match the NTSC regeneration rate. The NTSC regeneration rate is actually 1365 $F_h$, and therefore, decoders at subscriber locations must perform a rate conversion in order to accurately regenerate the analog NTSC video signals. A single 21.5 Mbps multiplex data stream may be modulated and transmitted within a 6 Mhz cable channel, and two 21.5 Mbps multiplex data streams can be interleaved and transmitted over a single C-Band satellite transponder.

Referring still to FIG. 3, each field of the frame begins with a VSYNC word 42, and each line begins with an HSYNC byte 46 followed by an offset byte. As described hereinafter, a service demultiplexer in a decoder at each subscriber location uses the HSYNC and VSYNC patterns to establish frame and field synchronization after receiving a multiplex data stream. The VSYNC word 42 is generated similarly for each field, but is bit-inverted every other field. The HSYNC byte 46 is the same for each line. The VSYNC word 42 in each field is followed by a "transport layer" 44. In general, the transport layer 44 in each field contains "system data" needed for operation of the system of the present invention, and more importantly, specifies the contents and structure of the "system data" and service data that follow in the field. As described hereinafter in greater detail, an important part of the transport layer 44 is the "multiplex map" (not shown) which follows directly after the VSYNC word 42 in each field. In accordance with the present invention, the multiplex map specifies the number and location of transport layer packets that follow in the field and is dynamically adjustable on a per field basis to achieve great flexibility.

As shown in FIG. 3, the transport layer 44 of each field is followed by a service data space 48 which contains the audio and video service data carried in the multiplex data stream. As explained hereinafter in greater detail, the plurality of video services and audio services carried in each field are variably partitioned within the field so that the system can accommodate multiple service data rates. The data rate for a service can vary from the HDTV rate (approx. 17 Mbps) to the telecommunications standard T1 data rate of 1.544 Mbps. In accordance with the present invention, the amount of data assigned to video, audio and other services can be adjusted among the services. Portions of the service data space not used for audio services may be reassigned as video or other service data. Audio services are not tied to video services within the field, and therefore, the system can provide "radio" services. Because of the dynamic allocation of service data within a field, the individual video services are not required to have the same data rate. The possible combinations of services that a programmer can provide in one multiplex data stream are limited only by the maximum data rate of the multiplex data stream (i.e., 21.5 Mbps) and the variable partitioning increment size. With the flexible method of the present invention, any future digital services with data rates as low as the telecommunications standard T1 rate can be accommodated. As further shown, the transport layer 44 and service data portion 48 of each frame are error coded using a 20 byte Reed-Solomon error correcting code. Those skilled in the art will appreciate, however, that any block-oriented error correcting scheme may be employed without deviating from the true spirit and scope of the present invention.

Figure 4:
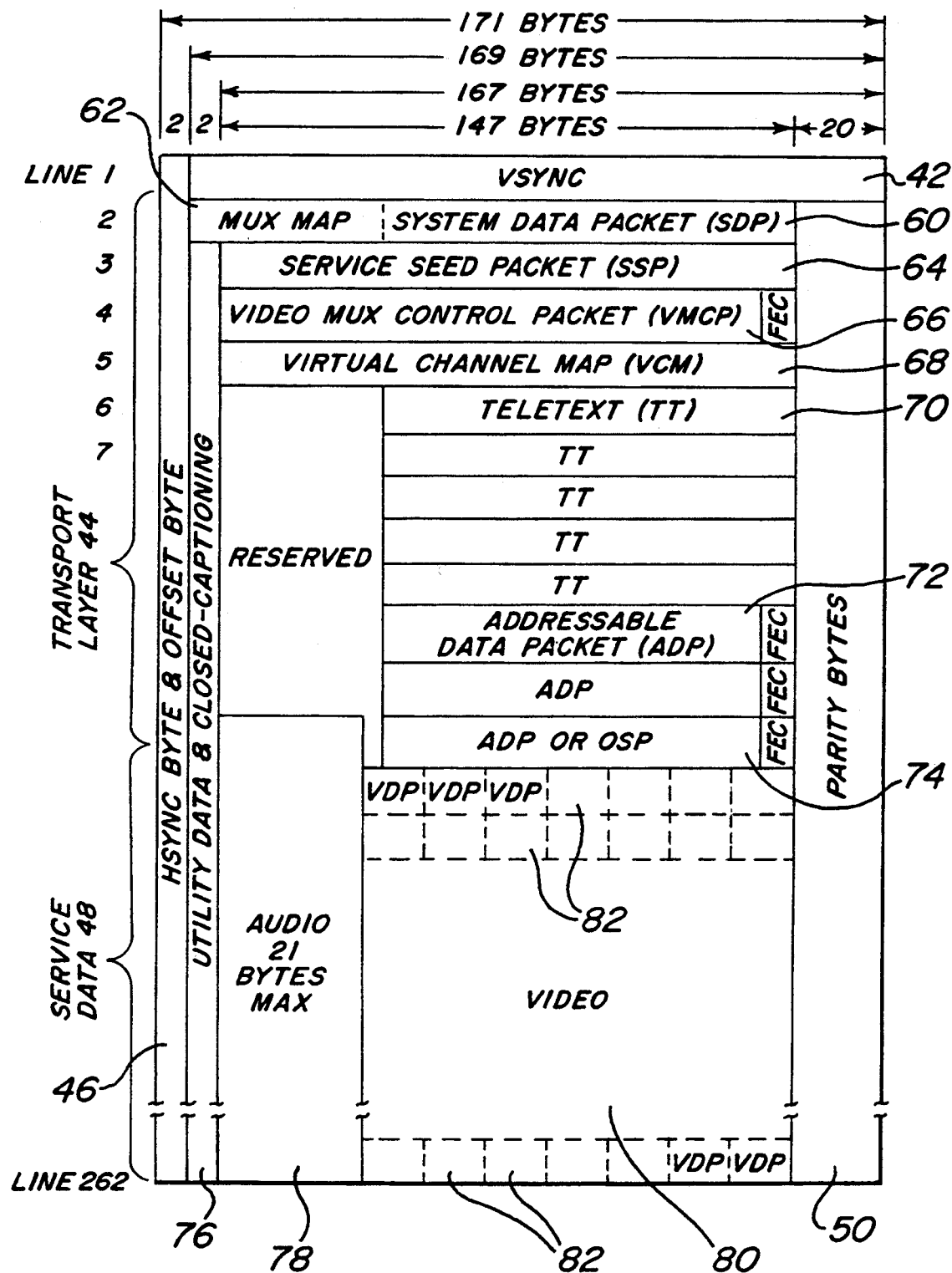
FIG. 4 shows in detail the data and services that can be carried in an exemplary first field of a frame of the multiplex data stream of FIG. 2 in accordance with the method of the present invention.

FIG. 4 shows further details of the general arrangement and contents of the first field of an exemplary frame of a multiplex data stream in accordance with the present invention. As shown, the first line of the transport layer 44 (i.e., line 2 of the field) comprises a system data packet 60 (SDP) that includes a multiplex map 62. Subsequent lines of the transport layer may comprise service seed packets 64 (SSP), video multiplex control packets 66 (VMCP), virtual channel map packets 68 (VCM), teletext data packets 70 (TT), addressable data packets 72 (ADP), and optional system packets 74 (OSP). In accordance with the method of the present invention, the multiplex map 62 is transmitted with each field and specifies the number and location of every other type of data packet in the transport layer 44 of that field. With the multiplex map 62, the number and location of each other type of transport layer packet may be dynamically altered on a per field basis to achieve a great degree of flexibility. For example, as described below in greater detail, the multiplex map 62 can be used in a "full-field" mode to allow an entire field of the multiplex data stream to be used for system data such as addressable data packets 74 (ADPs). It should be noted that not every type of transport layer packet need be transmitted in every field. For example, some packets, such as system seed packets 64 (SSPs), may be transmitted only in the first few fields of a cryptocycle. The content and arrangement of data within each packet will be described hereinafter in greater detail.

Still referring to FIG. 4, a portion of each field is allocated to service data 48. According to the method of the present invention, audio services, utility data and closed-captioning services and video services are separated within the field. As shown, utility and closed-captioning data may be transmitted at the beginning of each line of the transport layer 44 as well. The audio portion 78 of each field is proportionally allocated among the various audio services being transmitted. The size of the audio portion 78 of each field is adjustable for accommodating different numbers of audio services. According to a preferred embodiment, the audio portion 78 of each field consists of a maximum of 21 bytes on each line of the service data area 48.

The video portion 80 of the service data area 48 of each frame comprises a plurality of smaller video data packets 82 (VDPs). In the present embodiment, the VDPs are each 60 bits wide, although any size VDP may be used without deviating from the spirit and scope of the invention. Each of the 60 bits in an VDP may be allocated to a particular video service being transmitted. For example, if there are 5 video services being transmitted, each service could be allocated 12 bits out of every VDP. According to the method of the present invention, the 60 bits in each VDP are allocated among the various services in proportion to the individual data rate of each service. For example, a video service having a high rate may be allocated more bits in each VDP than a video service having a lower rate. Although the allocation of VDP bits in a single frame remains fixed, the allocation may be adjusted on a per frame basis. As explained hereinafter in greater detail, the video multiplex control packets (VMCPs) 66 in the transport layer 44 specify the video service allocation within the VDPs of a given field. In the preferred embodiment, even though the VMCPs are transmitted in the transport layer of every field, the allocation of services within each VDP may be dynamically altered on a per frame basis only. In this manner, the system and method of the present invention supports statistical multiplexing. Those skilled in the art will appreciate, however, that the allocation of services within each VDP may be dynamically altered on a per field basis, if desired.

Figure 5:
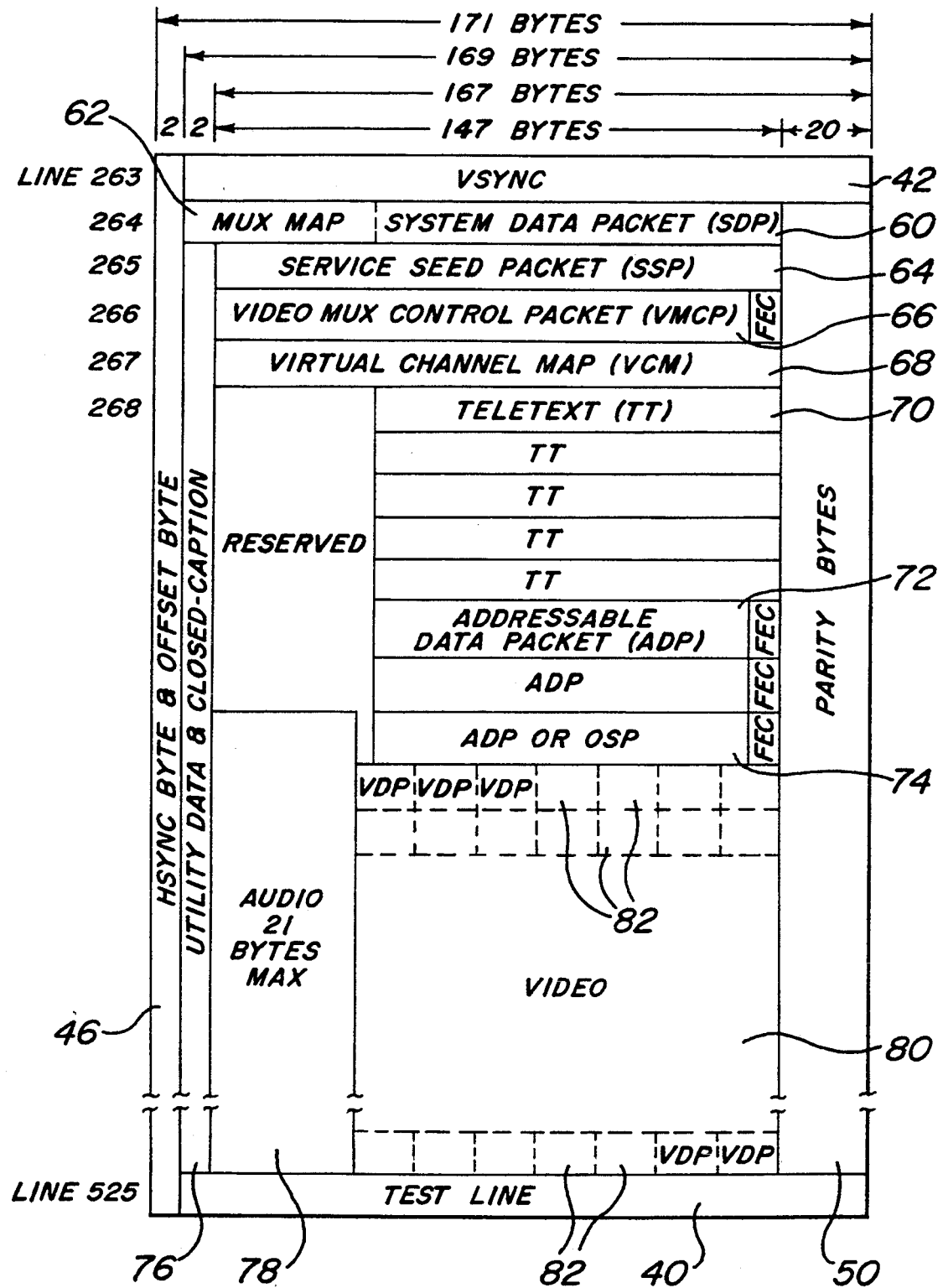
FIG. 5 shows in detail the data and services that can be carried in an exemplary second field of a frame of the multiplex data stream of FIG. 2.

FIG. 5 shows details of a second field of an exemplary frame of a multiplex data stream. As can be seen, the second field is generally similar in structure and arrangement to the first field; the main difference being the addition of the test line 40. As mentioned previously, the test line 40 is the last line of every frame of the multiplex data stream and allows each field to be exactly 261 lines (not including VSYNC). The test line 40 is not error coded with the Reed-Solomon code as are lines 264–524 of the second field. The test line may be used to carry system test data, if desired.

Referring to both FIGS. 4 and 5, the third and fourth bytes on each line of each field carry utility and closed-captioning data. Only the first 15 of 16 bits are utilized for utility data; the 16th bit is used for closed-captioning data. Additionally, five lines in each frame (i.e., both fields) do not carry utility and closed-captioning data. These include the two VSYNC lines 42, the test line 40 and lines 2 and 264 of the first and second fields respectively. The total bit capacity for utility data for one frame is then:

(525-5)lines * (15 bits/line)=7800 bits.

In accordance with the present embodiment, those 7800 bits are partitioned into 8 separate "channels" of utility data. Thus, there are 975 bits/channel in each frame. These are error coded using a (3,2,13) convolution FEC to yield an error-corrected capacity of:

975 * $\frac{2}{3}$ = 650 bits/channel/frame.

The resultant maximum data rate for each channel of utility data is then:

$$\frac{650 \text{ bits}}{\text{frame}} \times \frac{1 \text{ Frame}}{525 \text{ lines}} \times \frac{15,743 \text{ lines}}{s} = 19.48 \text{ KBps}$$

This rate is slightly higher than the industry standard 19.2 KBps rate, but with the excess capacity, worst-case incoming data channels can be handled by running at the slightly higher rate. A 19.48 kHz clock is easily derived from $F_h$ since 19.48 kHz is equal to 2730/2205 $F_h$. This illustrates one advantage of relating the overall multiplex data rate to the horizontal line frequency. Alternatively, the utility data in each frame can be partitioned into 16 separate channels, where each channel runs at 9600 Kbps.

Closed-captioning data is transmitted in the last bit of the fourth byte of each line (i.e., bit 16 of the utility & closed-captioning data space). As with the utility data, closed-captioning data (i.e., 1 bit per line) is sent on the same 520 lines of each frame. As those skilled in the art know, video services often have associated closed-captioning data. In the analog NTSC format, two bytes (i.e., two characters) of closed-captioning data are sent on line 21 of each analog video frame. In accordance with the method of the present invention, the 520 closed-captioning bits are partitioned into 20 separate "channels" of 26 bits each. Each "channel" corresponds to a different video service in the multiplex data stream. In each frame, therefore, up to 20 video services may carry associated closed captioning data. The first 26 bits in the frame correspond to video number 1, the second 26 bits correspond to video number 2, and so on. In the present embodiment, only the first sixteen bits of each 26 bit partition are used. Thus, as with line 21 in the analog NTSC format, two characters are transmitted per frame per video service.

As mentioned above, the audio service portion 78 of each field is adjustable depending on the number of audio services being transmitted. Audio service data is only transmitted on 500 of the 520 lines of each frame. The amount of each line allocated to audio service data depends on the number of audio services being transmitted. Audio services are carried in groups of four "channels" where a channel is defined as a data rate of 8 $F_h$. A rate of 8 $F_h$ was chosen because it corresponds approximately to 125.8 Kbps, which is near the single channel audio data rates for several standards in use throughout the audio and subscription television industries. Up to a maximum of 20 audio channels may be transmitted per frame according to the present embodiment. To satisfy the 8 $F_h$ data rate, each channel must be allocated 8 bits per line for every line in a frame. Because audio service data only appears on 500 of the 525 lines, however, an additional byte must be sent every 20 lines for each audio channel. FIG. 6 illustrates the content and arrangement of the audio data portion of a field of the multiplex data stream when 20 channels of audio are carried. FIG. 7 illustrates the content and arrangement when 16 channels of audio are carried. As explained hereinafter, the multiplex map 62 in each field specifies the number of audio channels carried in that field in order to provide the service multiplexers and service demultiplexers with the necessary information for inserting and extracting the audio services to and from the multiplex data stream, respectively.

Figure 8:
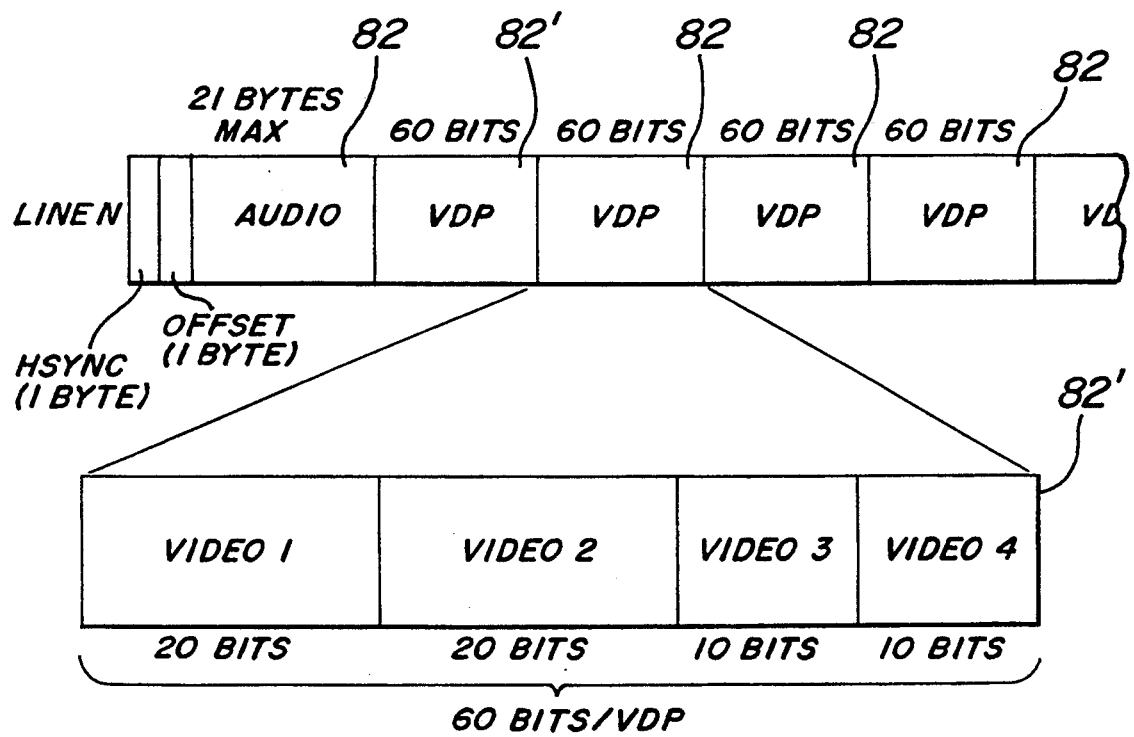
FIG. 8 shows in detail the general arrangement and contents of an exemplary video data packet.

As mentioned above, video services are carried in the video service portion 80 of each field. The video service portion 80 comprises a plurality of video data packets 82 (VDPs), each 60 bits wide. Portions of each VDP are allocated among the video services carried in the multiplex. FIG. 8 illustrates an exemplary line N of a field of the multiplex data stream showing several VDPs 82. In accordance with the method of the present invention, the VDPs 82 are spaced consecutively after the HSYNC, offset and audio service data on the line. FIG. 8 also shows the contents of an exemplary VDP 82. In the example shown, four video services, 1, 2, 3 and 4, are being carried in the multiplex. Video services 1 and 2 have higher individual data rates than video services 3 and 4, and consequently, videos services 1 and 2 are each allocated 20 bits of the VDP, while video services 3 and 4 are each allocated only 10 bits. As mentioned, the allocation of bits within each VDP is adjustable on a per frame basis. Although in the present embodiment the VDPs are sixty (60) bits wide, the VDPs may be any width, such as 80 bits wide or 120 bits wide, without deviating from the spirit and scope of the present invention.

Figure 9:
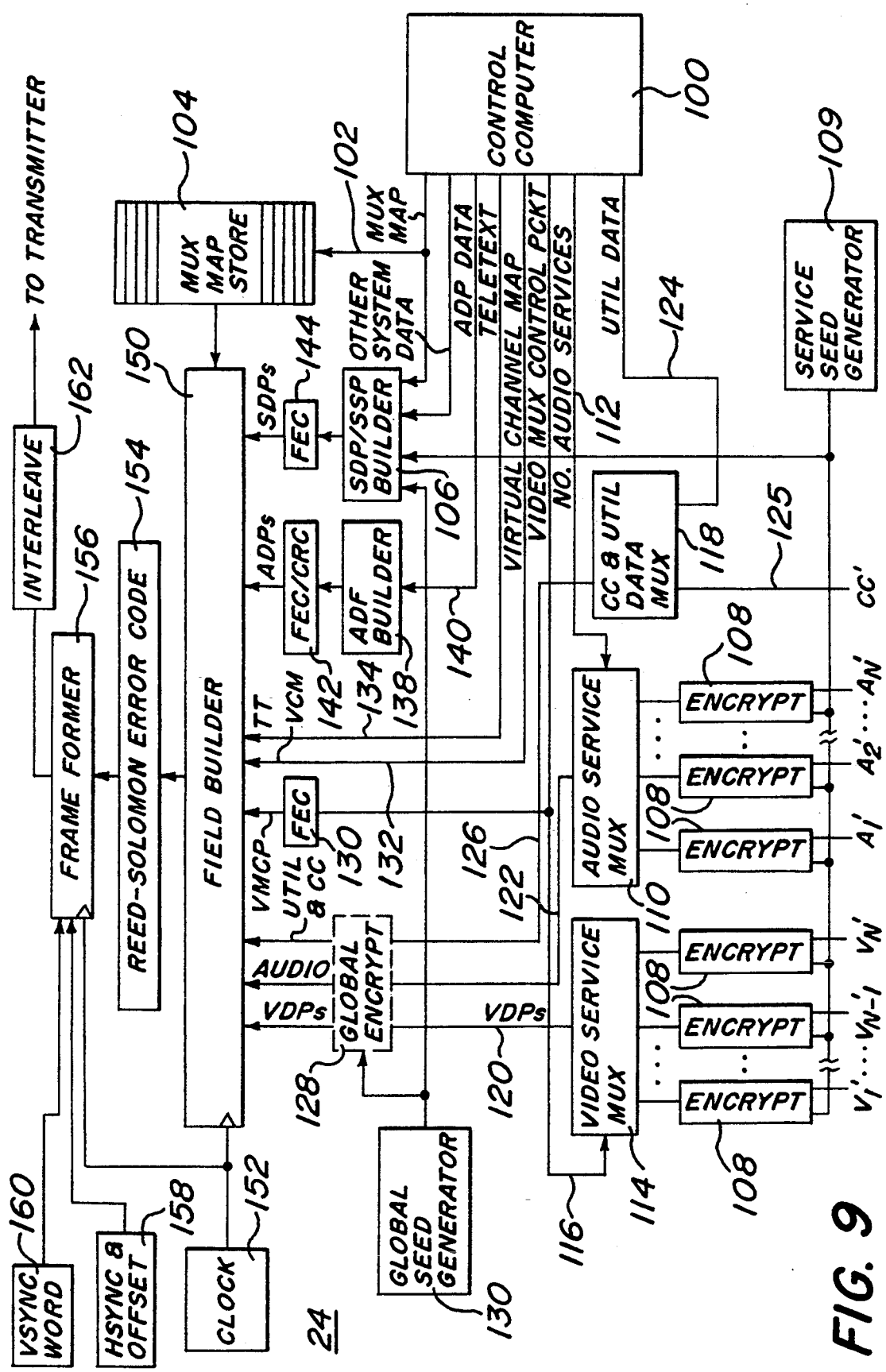
FIG. 9 is a block diagram illustrating details of the service multiplexer of FIG. 1 in accordance with the present invention.

As described above, each programmer's multiplex data stream 26 is generated by the service multiplexer 24 in the programmer's encoder 12 (see FIG. 1). FIG. 9 is a block diagram of a service multiplexer 24 according to the present invention. The service multiplexer 24 operates in accordance with the method of the present invention to multiplex a plurality of digital services for transmission to remote locations (not shown). As shown in the FIG., a plurality of compressed digital video services $V'_1 \ldots V'_N$, compressed digital audio services $A'_1 \ldots A'_N$, and associated closed-caption data CC are input to the service multiplexer 24. By way of example, these digital services may be the services input to the service multiplexer 24 of programmer1 in FIG. 1. As explained previously, the video and audio services need not be compressed, but for most applications compression is desirable.

The service multiplexer 24 comprises a control computer 100 that controls the overall operation of the multiplexer 24. Various parameters are input to the control computer 100 by the programmer, such as how many and what types of digital services are being multiplexed. In response to this information, the control computer 100 generates a multiplex map which, as described above, specifies the number and location of various packets in the transport layer of the multiplex. Details of the content of the multiplex map will be provided hereinafter. The control computer 100 feeds the multiplex map to a storage memory 104. As described hereinafter, a field builder 150 "reads" the multiplex map in order to construct a field of the multiplex data stream. The control computer 100 generates a multiplex map for each field. As mentioned, the multiplex map is carried in a system data packet (SDP) that occupies the first line of every field after the VSYNC word. Accordingly, the control computer 100 also feeds the multiplex map to an SDP/SSP builder 106 which forms the SDP that contains the multiplex map.

Figure 11:
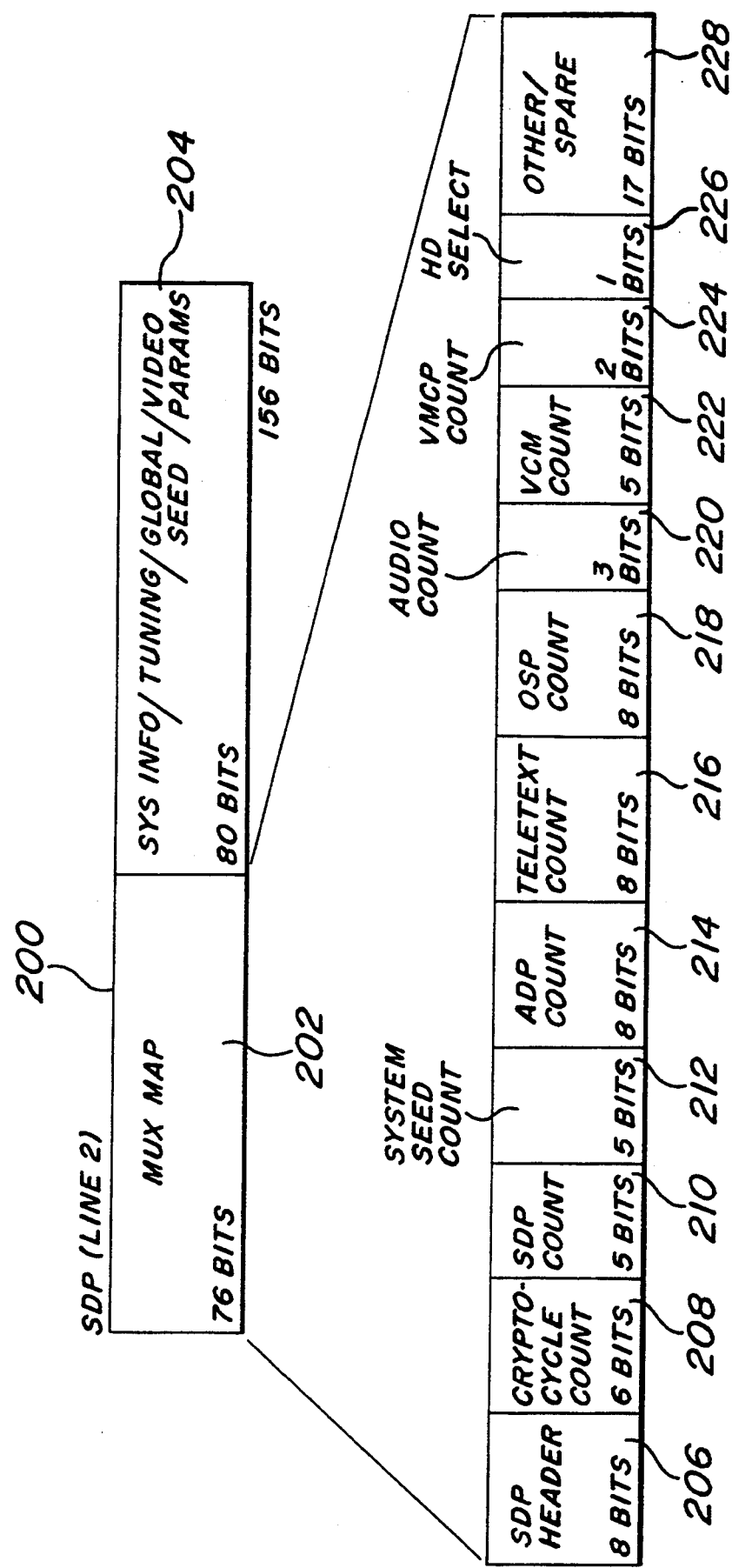
FIG. 11 shows in detail the general arrangement and contents of the multiplex map transmitted in each field of the multiplex data stream in accordance with the method and system of the present invention.

FIG. 11 illustrates the general arrangement and contents of an exemplary system data packet (SDP) 200 that carries the multiplex map. As can be seen, the SDP 200 is preferably 156 bits long and comprises the multiplex map 202 and a system data area 204 for carrying other system related information, such as system tuning information, global seeds or video parameter information. The system data area 204 may be used for any such system related information and the contents and arrangement of information within the system data area 204 are flexible. According to the present embodiment, the multiplex map 202 is 76 bits in length. The multiplex map (hereinafter sometimes referred to as the "mux map") 202 must be present in every field because it contains information regarding the contents and format of the rest of the field. Specifically, the mux map 202 describes the layout and type of packets and data in the transport layer of each field. As described hereinafter in greater detail, service demultiplexers at each remote location interpret the mux map 202 to determine how to extract the plurality of digital services from the multiplex data stream. As those skilled in the art will appreciate, the mux map 202 is critical to the functioning of the system of the present invention. Accordingly, the mux map is transmitted unencrypted, and the SDP 200 within which the mux map 202 is located is heavily error corrected.

As shown in FIG. 11, the mux map includes an SDP header 206 that indicates that the SDP 200 contains the mux map 202. A crypto-cycle count 208 indicates which position in the cryptocycle that the particular field occupies. The crypto-cycle count 208 is necessary so that the decoders at remote locations know where the crypto-cycle boundaries occur. As described hereinafter, seeds used for encrypting each service are changed at every cryptocycle boundary. An SDP count 210 specifies the number of additional SDPs present in the field. Only the SDP 200 on the second line of every field carries the mux map 202. Other SDPs may be transmitted within a field, however, so that other system related information may be provided to the decoders at remote locations. According to the present embodiment, a maximum of 32 SDPs are possible per field. A system seed packet count 212 specifies the number of packets in the transport layer that contain encryption seeds. An ADP count 214 specifies the number of addressable data packets in the field. In a full-field mode, the ADP count may specify that the entire field of the multiplex contains ADPs. Thus, ADPs may be extended throughout the entire field. In addition, ADPs may be transmitted in place of teletext packets. A teletext count 216 specifies the number of teletext packets in the field. As with ADPs, the teletext packets can be extended throughout the entire field in the "full-field" mode. An OSP count 218 specifies the number of optional system packets in the field. Again, OSPs may be extended throughout the field in "full-field" mode. An audio count 220 specifies the number of audio services carried in the multiplex data stream. As described above in connection with FIGS. 6 and 7, audio services are carried in groups of "four channels." Thus, the audio count may specify either 0, 4, 8, 12, 16 or 20 audio services. As explained hereinafter, the audio count 220 determines the how the audio data space in each field is allocated among the audio services. A virtual channel map (VCM) count 222 specifies the number of virtual channel map packets that are carried in a given field. Virtual channel maps are described hereinafter. A video multiplex control packet count 224 indicates the number of video multiplex control packets that are carried in the field. As described hereinafter, the video multiplex control packets specify the number of bits in each video data packet (VDP) that are allocated to each video service. An HD select bit 226 is provided for indicating whether the field carries High Definition Television (HDTV) information. The format of a field in HD mode will be described later. The mux map 202 ends with seventeen (17) spare bits which may be used for future expansion of the system. The general contents and arrangement of each of the other packets carried in the transport layer will be described hereinafter.

Referring again to FIG. 9, each of the digital video services, $V'_1 \ldots V'_N$, and digital audio services, $A'_1 \ldots A'_N$, are fed to individual service encryptors 108. Digital service encryptors are well known to those skilled in the art, and there are many encryption techniques and many ways to implement an encryptor. In the present invention, the encryptors 108 are not limited to any one technique or implementation. However, an important feature of the present invention is that each digital service is independently encrypted.

Data encryptors, such as encryptors 108, typically use a "seed" value to generate a pseudo-random binary sequence which is then convolved, typically via modulo-2 addition, with the service data stream to produce an encrypted service stream. Accordingly, the multiplexer 24 includes a service seed generator 109 for supplying each encryptor 108 with its own "seed" value. Thus, each service within the multiplex data stream is individually encrypted using a unique service seed. As those skilled in the art know, a service can be decrypted as long as the decryptor has the " seed" used to encrypt the service. According to the present invention, the seed used to encrypt a given service is changed periodically. More specifically, the service seeds are changed every cryptocycle, which in the preferred embodiment, comprise eight (8) fields. Thus, a given seed value is used to encrypt a particular service over 8 fields of the multiplex data stream and then changed. Changing the service seeds every cryptocycle enhances the cryptographic strength of the system. As described hereinafter, the service seeds are transmitted to the remote locations in service seed packets (SSPs). As shown in FIG. 9, therefore, the service seed generator 109 provides the seeds to the SDP/SSP builder 106 which constructs the service seed packets (SSPs). Details of the contents and arrangement of an SSP are provided hereinafter.

As those skilled in the art will appreciate, time is needed at a remote location to receive the seeds and process them in order to be ready to decrypt the incoming encrypted service data. Accordingly, seeds are transmitted to remote locations one cryptocycle in advance of the data the seeds were used to encrypt. This allows the demultiplexer in the decoder at each remote location enough time to have the seeds ready for the decryption process and avoids unnecessary buffering of the incoming service data stream.

The encrypted video services are fed to a video service multiplexer 114 that constructs the video data packets VDPs. The control computer 100 feeds video multiplex control packets (VMCPS) to the video multiplexer 114 via line 116. The video service multiplexer allocates portions of each VDP to each video service in accordance with the information contained in the VMCPs. The VMCPs are also fed to a forward error correction (FEC) circuit 130 where error code bits are added to the VMCP. From the FEC circuit 130, the VMCPs are fed to the field builder 150 where they are inserted into each field of the multiplex data stream. As explained, the multiplex map specifies where in each field the VMCPs are located. According to the method of the present invention, when the multiplex data stream 26 is received at a remote location, a service demultiplexer in a decoder at that location extracts the multiplex map from each field, determines the location of the VMCPs in the field, and employs the VMCP information to determine the video service allocation in each VDP. In this manner, the video services can be extracted from the multiplex data stream.

According to the present embodiment, up to two VMCPs may be transmitted with every field of the multiplex data stream. Each VMCP specifies the allocation or "video weighting" for up to 10 video services. Thus, if no more than 10 services are carried in the multiplex data stream, then only one VMCP is needed per field. If more than 10 video services are carried, however, an additional VMCP is needed. In the present embodiment, no more than 20 video services may be carried in the multiplex, and therefore, no more than two VMCPs are ever transmitted in a given field. Those skilled in the art will appreciate, however, that the system of the present invention does not have to be limited to 20 video services, and therefore, any number of video services and requisite VMCPs may be transmitted per field. For example, up to forty video services could be carried in which case as many as four VMCPs may be transmitted per field.

FIG. 12 shows the general arrangement and contents of a VMCP 230 that specifies the video weighting (i.e., allocation) for the first 10 video services carried in the multiplex of the present example. As can be seen, the VMCP contains a first data field 232 that specifies the video weighting. Each video service (i.e., services 1–10) is represented by a 6-bit descriptor that indicates how many bits of each video data packet (VDP) are allocated to that service. The first six bits of the video weighting field 232 of the VMCP 230 contain the descriptor for video 1, the second six bits contain the descriptor for video 2, and so on. An additional data field 234 is provided in the VMCP for carrying other information about the video services, such as, for example, panscan control information and/or EIDAK control information. FIG. 13 illustrates the contents of a second VMCP 236 required if more than 10 video services are to be carried in the multiplex data stream. The format of the second VMCP 236 is identical to that of the first VMCP 230 of FIG. 12, except that the video weighting field 238 and additional data field 240 provide video weighting and other information for services 11 through 20. As explained, the VMCPs are employed in the service multiplexers and demultiplexers to facilitate insertion and extraction of individual video services from each field of the multiplex data stream.

The digital audio services, e.g. $A'_1 \ldots A'_N$, are fed to an audio service multiplexer 110. The control computer 100, via line 112, provides the audio multiplexer 110 with an indication of how many audio services are to be multiplexed. As described previously in connection with FIGS. 6 and 7, audio services are carried in groups of four "channels" , and up to 20 audio channels may be transmitted per field according to the present embodiment. FIGS. 6 shows how the audio service multiplexer 110 multiplexes twenty audio services for insertion in a given field of the multiplex data stream. FIG. 7 shows how sixteen audio services are multiplexed by the audio multiplexer 110.

A utility data and closed-caption data multiplexer 118 accepts utility data from the control computer via line 124 and closed caption data via line 125. The multiplexer 118 constructs the two bytes of utility data and closed-captioning data that appear on 520 lines of each field of the multiplex data stream. The content and arrangement of the utility and closed-captioning data is described above in connection with FIG. 4.

The video data packets (VDPs), multiplexed audio services, and utility and closed-caption data are fed to the field builder 150 via lines 120, 122, and 126 respectively. As mentioned, the field builder 150 constructs each field of the multiplex data stream according to the information contained in the multiplex map. According to one embodiment of the present invention, the VDPs, multiplexed audio services and utility and closed-captioning data may be further encrypted with a global encrypter 128. The global encryptor 128 may be functionally equivalent to the independent service encryptors 108. A global seed generator 130 creates the seed value used by the global encryptor 128 to encrypt the VDPs, multiplexed audio services and utility and closed-caption data. As with the independent service seeds, the global seed is changed every cryptocycle. The global seeds must also be transmitted to each remote location so that the "global layer" of encryption may be removed. To this end, the global seed generator 130 also provides the global seeds to the SDP/SSP builder 106 which inserts the global seeds in a system data packet 106 that is carried in at least one field of every cryptocycle.

The control computer 100 also generates a virtual channel map packet (VCMP) that is fed via line 132 to the field builder 150. Details of the contents and arrangement of a virtual channel map packet will be provided hereinafter. Basically, the virtual channel map provides a relationship between a television channel selected by a subscriber and a video service carried in the multiplex data stream. As described hereinafter in greater detail, when a subscriber selects a "television channel" for viewing, the service demultiplexer in a decoder at the subscriber location interprets the virtual channel map to determine which video service in the multiplex data stream corresponds to the selected television channel. Once the decoder knows which video service to extract, the demultiplexer interprets the video multiplex control packet (VMCP) to determine which bits in each video data packet (VDP) are allocated to that selected video service. With this information, the demultiplexer then can extract the selected video service from each VDP in the multiplex data stream.

A programmer or a cable operator may wish to provide teletext data to the subscribers at various remote locations. Teletext data can be displayed on a subscriber's television set to convey various information to the subscriber. To this end, the control computer 100 can feed teletext data to the field builder 150 for insertion into various fields of the multiplex data stream.

As described hereinafter in greater detail, the control computer 100 may also provide subscriber specific information, known as "addressable data". This information is fed to an addressable data packet (ADP) builder 138 which constructs individual ADPs. An ADP contains a unique user address which acts as a "wake-up" call to a single target decoder in the system. ADPs carry subscriber specific information to individual subscribers. For example, an ADP may carry service authorization information which alerts a particular subscriber's decoder as to which services the subscriber has paid for. ADPs provide important information, and therefore, are error protected using a combination of FEC and CRC error codes as shown at block 142.

As mentioned, the field builder 150 interprets or "reads" the multiplex map and constructs each field of the multiplex data stream according to the multiplex map for that field. A clock generator 152 provides a clock signal to the field builder to insure that the individual lines of each field are generated at the proper rate, which according to the preferred embodiment is equal to the horizontal television line rate, $F_h$, of the particular video format being employed throughout the system (e.g. PAL or NTSC). As those skilled in the art will appreciate, the relation to analog video frequencies simplifies hardware design in that standard analog video circuitry may easily be employed to produce analog compatible television signals at subscriber locations and all clock frequencies required in the system may be derived from a base frequency using suitable phase-lock loops and frequency dividers and multipliers. Once constructed, successive lines of each field are fed to a Reed-Solomon error coding circuit 154 that adds additional parity bytes to each line according to the Reed-Solomon error coding technique. As those skilled in the art will appreciate, other forms of block error coding may be used, and the present invention is by no means limited to the use of a Reed-Solomon code. For example, another non-binary BCH error coding technique may be employed.

The fully constructed, error coded fields are next sent to a frame former 156 that inserts the HSYNC and offset bytes at the beginning of each line of every field and also inserts the VSYNC word at the beginning of each field. For every two fields, i.e., every frame, the frame former 156 inserts the test line to ensure that each frame comprises the proper number of lines. As described above, the overall number of lines in each frame corresponds to the number of "lines" in the particular analog video format being employed throughout the system. For example, when NTSC video signals are being employed, each frame comprises 525 lines; when PAL video signals are being employed, each frame comprises 625 lines.

Figure 10:
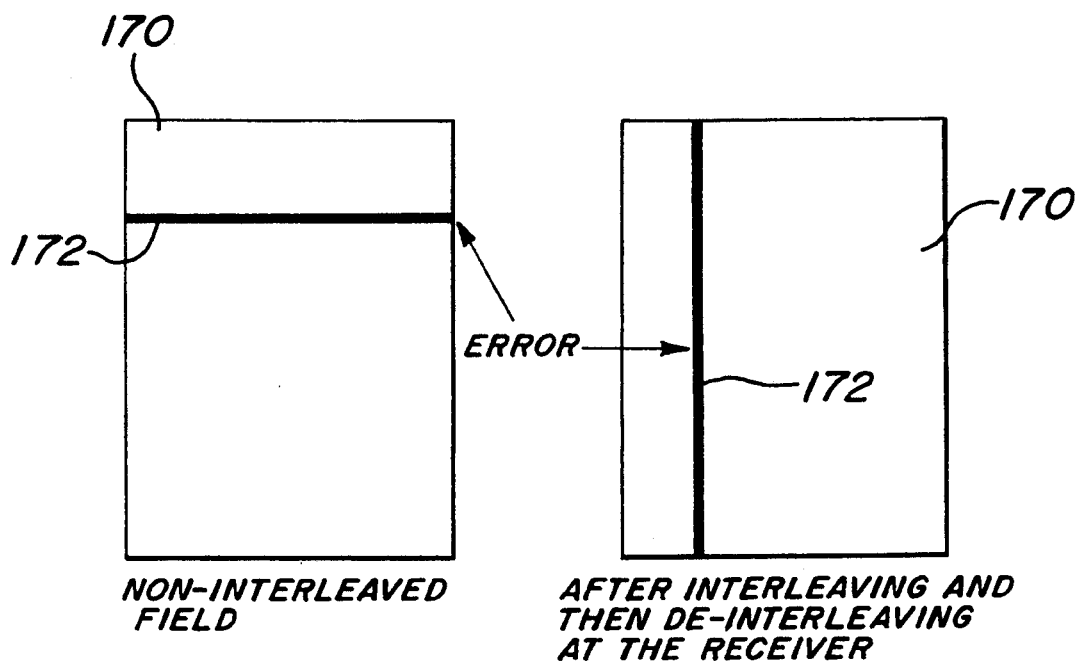
FIG. 10 graphically illustrates the reduction of burst errors during the transmission of a multiplex field in accordance with an aspect of the present invention.

The output of the frame former 156 is a complete multiplex data stream, such as data stream 26 in FIG. 1. The multiplex data stream output from the frame former 156 may be transmitted directly to remote locations. According to a most preferred embodiment of the present invention, however, portions of the each frame of the multiplex data stream are transmitted in an interleaved format. As shown in FIG. 9, therefore, the multiplex data stream is fed to an interleaver 162. At block 162, the data in each frame, excluding the VSYNC words, HSYNC and offset bytes, and test line, is transmitted in an interleaved manner. Essentially, therefore, all the data that is protected by the Reed-Solomon error code is transmitted in an interleaved fashion. By interleaving the data, burst error protection increases linearly by a factor equal to the number of lines of interleaved data. FIG. 10 illustrates the advantages of interleaving. Without interleaving, a field 170 of the multiplex may encounter a burst error 172 that corrupts an entire line of the field 170. The Reed-Solomon error coding performed on each line is incapable of correcting such a large number of corrupted bits. By transmitting the field in an interleaved manner and then de-interleaving at the receiver, that burst error 172 is spread over multiple lines of the field 170, as shown. Thus, only a single bit in each line is corrupted. As those skilled in the art know, the Reed-Solomon error code applied to each line is very capable of correcting a single bit error in a given line of the field.

In accordance with the present invention, the multiplex data stream 26 is fed to a transmitter (not shown) for transmission to a plurality of remote locations in the system. A remote location may be a DBS subscriber, cable head-end installation or a cable subscriber. As those skilled in the art will appreciate, the multiplex data streams 26 generated by each programmer (see FIG. 1) must be modulated prior to transmission via satellite. Typically, each programmer modulates its multiplex data stream on a unique frequency for transmission over a single satellite transponder operating at that frequency. At the remote locations, receivers are needed to receive the multiplex data streams and demodulate them.

FIG. 14 is a block diagram illustrating further details of the system 10 of the present invention. Whereas FIG. 1 illustrated the details of various programmer locations, FIG. 14 illustrates the details of various remote locations, including a DBS subscriber location 250, a cable head-end installation 252, and cable subscriber locations 254. By way of example, the multiplex data stream 26 transmitted by programmer1 in FIG. 1 is indicated in FIG. 14 as a solid line, and the multiplex data stream 26' transmitted by programmerN in FIG. 1 is indicated by the dashed line. It is understood that there may be many programmers in the system of the present invention, and therefore, a plurality of multiplex data streams may be transmitted via satellite to the remote locations.

As shown in FIG. 14, in the case of a DBS subscriber 250, the subscriber has a satellite down-link 256 for receiving a selected multiplex data stream from the satellite 30. A receiver 258 receives and demodulates the selected multiplex data stream. A set-top decoder 260 is provided at the DBS subscriber location 270 for extracting selected digital services from the multiplex data stream for display on a television set 270 at the location 250. Details of the set-top decoder 260 will be provided hereinafter.

In the case of a cable head-end installation, e.g. installation 252 of FIG. 14, multiple receivers 272 are provided for receiving multiple multiplex data streams from various programmers. Each multiplex data stream is received via a satellite down-link 262 and demodulated with a respective one of the receivers 272. As those skilled in the art know, coaxial cables used in cable distribution networks have the capacity to carry a plurality of contiguous 6, 7 or 8 MHz channels. In accordance with the preferred embodiment of the present invention, each multiplex data stream received at cable head-end 252 is fed from its respective receiver 272 to a modulator 274, where it is modulated on a distinct 6 MHz cable channel. Although 6 MHz channels are employed in the preferred embodiment, 7 or 8 MHz channel may be employed. In the preferred embodiment, the modulators 274 employ 4-VSB (vestigial sideband) modulation, however, any suitable modulation technique may be employed. Each of the modulated data streams is then provided to a combiner 278 that combines the individual 6 Mhz channels into a single wide-band signal that is then transmitted via a cable distribution network 278 to a plurality of cable subscriber locations 254. Each subscriber location 254 has a decoder 280 (similar to the decoder 260 of the DBS subscriber 250) that extracts selected digital services from a selected multiplex data stream for display on a television set 282 at the subscriber location 254.

FIG. 15 provides a detailed block diagram of the decoders 280 of FIG. 14. As shown, the decoders 280 comprise a demodulator 290 for demodulating incoming multiplex data streams. A tuner 292 provides the demodulator 290 with the appropriate carrier frequency signal for demodulating a selected multiplex data stream. Recall from FIG. 14 that each multiplex data stream received at the cable head-end installation 252 is modulated on a unique 6 Mhz channel. When a subscriber selects a television channel (i.e. video and related audio services), the selection is input to a tuning map 294 stored within the tuner 292. The tuning map 294 "maps" the subscribers selection with the multiplex data stream that carries the selected services. In response, the tuner 292 supplies the demodulator 290 with the appropriate carrier frequency for demodulating the particular multiplex data stream containing the selected services. Thus, in response to a subscriber's selection, the decoder 280 "tunes" to the appropriate 6 MHz cable channel that contains the multiplex data stream within which the selected services are carried. Once the appropriate multiplex data stream has been received and demodulated it is fed to a service demultiplexer 298 that operates in accordance with the method of the present invention to extract the selected services from the multiplex data stream. Details of the demultiplexer 298 are provided hereinafter.

As described previously, the digital video and audio services may be compressed at the encoder 12 of each programmer. Consequently, the decoders 280 at each subscriber location further comprise data decompressors 300 for decompressing the compressed digital video and audio services extracted from the multiplex data stream by the demultiplexer 298. Video related services, such as video services, associated closed-captioning data, and teletext data are fed to a video processor 302 which converts the digital service information back into an appropriate analog video format, such as NTSC or PAL, for display on a television set 306 at the subscriber location. As described above, in accordance with the present invention, various parameters of the multiplex data stream, such as the number of lines in each field and the rate at which each line is transmitted, are related to the particular analog video format being produced by the video processor 302 in each decoder. So far, the general arrangement and contents of the fields of the multiplex data stream have been described for the case where the video processor 302 is designed to reconstruct NTSC format signals. Details of the arrangement and contents of the multiplex fields in the case where PAL video is being employed are provided hereinafter. According to the invention, the video processor 302 of each decoder 280 employs standard analog devices for generating analog video signals. The particular devices employed again depend upon whether the system is being used to generate PAL video, NTSC video or some other format.

According to the present embodiment, the demultiplexer is capable of extracting four audio services or "channels" at a time. As shown in FIG. 15, each of the extracted audio signals is fed to a decompressor 300 for decompression. An audio processor 304 is provided for converting the digital audio services to analog format for output to a speaker device 308. As mentioned previously, there are many digital and analog formats in use throughout the industry, and the present invention is not limited to any one format. Accordingly, the function of the service multiplexers and demultiplexers in the system of the present invention is not dependent upon the particular audio formats being used. The system may use the SEDAT-1 audio format, or some other format.

The decoders 260 employed at DBS subscriber locations function similarly to the decoders 280 at cable subscriber locations. The difference is that, in a DBS decoder, the tuner 292 "tunes" to a particular satellite transponder rather than a particular 6 MHz cable channel in order to receive and demodulate the appropriate multiplex data stream carrying the services that the subscriber selected.

FIG. 16 is a functional block diagram of the service demultiplexer 298 of FIG. 15. The demultiplexer 298 receives a multiplex data stream at an input 319. A de-interleaver 320 de-interleaves the portions of the multiplex data stream that are transmitted in an interleaved format. Next, a synchronizer 322 establishes frame and field synchronization. In accordance with the method of the present invention, field synchronization is established using a two-level syncing strategy. First, the synchronizer 322 searches for a repeating HSYNC pattern within the multiplex data stream. Although the HSYNC byte transmitted with every line of the field is a unique bit pattern, it is statistically likely to appear within other portions of the multiplex data stream. Its recurrence at precise line intervals, however, is very unlikely. Upon detecting a first HSYNC pattern, the synchronizer 322 looks to see if another HSYNC pattern exists exactly 169 bytes later (i.e., the next line of the field). After detecting a pre-determined number of repeating HSYNC patterns at the appropriate line intervals, the synchronizer 322 assumes it has established line synchronization. Next, the synchronizer 322 searches for the VSYNC pattern in order to complete the field synchronization process. Finding a VSYNC word is much easier once the synchronizer 322 has established HSYNC, because a VSYNC pattern always immediately follows an HSYNC. Thus, the synchronizer 322 simply examines the bits that follow each HSYNC until it finds a VSYNC pattern. As mentioned above, the unique VSYNC pattern is much longer (169 bytes) than the HSYNC patterns. Statistically, the VSYNC pattern is very unlikely to occur randomly in a multiplex data stream. As those skilled in the art will appreciate, the two-level syncing approach used herein speeds field synchronization.

Once field synchronization has been established, the multiplex data stream passes through error correction circuitry 324. As explained above, certain of the lines of each field are error coded. In the preferred embodiment, a Reed-Solomon code is employed. In particular, twenty (20) Reed-Solomon parity bytes are transmitted at the end of each of those lines. The error correction circuitry 324 examines the parity bytes to determine if any errors have occurred in transmission and corrects the errors, if possible, in accordance with the Reed-Solomon error correction algorithm. If an uncorrectable error occurs, the error correction circuitry 324 provides an error signal to a control microprocessor 338.

After detecting and correcting any bit errors, the multiplex map for each field of the multiplex data stream is extracted at block 326. Each of the fields of the multiplex data stream are processed one at a time in the sequence that they are received. When a field is received, the multiplex map is temporarily stored in a memory 328 for use by various other parts of the demultiplexer 298.

Once the multiplex map has been extracted and stored, the multiplex data stream passes to a field deconstructor 330. The field deconstructor 330 "reads" the multiplex map for a given field to determine where the transport layer packets are located. The transport layer packets (e.g., SDPs, SSPs, ADPs, TT lines, VMCPs and VCMs) are passed to a transport layer demultiplexer 336 that again "reads" the multiplex map to extract the individual packets from the transport layer and provide each packet to various other parts of the demultiplexer 298.

As shown in FIG. 16, the transport layer demultiplexer 336 passes system data packets (SDPs) and system seed packets (SSPs) directly to a control microprocessor 338 via line 337. The control microprocessor 338 extracts the service seeds and/or global seeds from the SSPs and SDPs, respectively. As explained above, the seeds used to encrypt service data during a given cryptocycle are actually carried in the SSPs and SDPs of the previous cryptocycle so that the demultiplexer 298 has sufficient time to prepare for decryption.

The video data packets (VDPs), multiplexed audio channels, and utility and closed-captioning data are provided by the field deconstructor 330 to a global decryption circuit 340 via line 334. As explained above, the global layer of encryption is optional in the system of the present invention, and therefore, the global decryption circuit 340 may not be provided. In the case where global encryption is employed, however, the control microprocessor provides global seeds to the decryption circuit 340 for decrypting the globally encrypted service data. Once the global layer of encryption has been removed by the global decryption circuit 340, the service data is passed to a service extractor 344 where selected services are extracted from the multiplex data stream in accordance with the method of the present invention.

Still referring to FIG. 16, addressable data packets (ADPs) are passed from the transport layer demultiplexer 336 to an address decoder 360. The decoders provided to each subscriber (e.g. decoder 280 of FIG. 15) contain a unique public address that is stored in the decoder at the factory. Addressable data packets have an address field that contains a unique decoder address. The address decoder 360 in the service demultiplexer 298 examines the address field of every ADP to determine if a given ADP is "addressed" to that decoder. If so, the address decoder 360 passes the ADP to the control microprocessor 338 which extracts the information from the ADP and responds accordingly. An addressable data packet may contain various subscriber specific information, such as, for example, service authorization information that informs the service demultiplexer 298 which services the subscriber has paid for. If a subscriber tunes to a "channel" that he has not paid for, the control micro-processor will be able to "block" access to that service; the control microprocessor may have security features built-in, or may pass information to a security element within the decoder. With ADPs, therefore, a cable operator is able to maintain individual control over the decoders installed throughout the system. Further details of the general arrangement and contents of an ADP will be provided hereinafter.

According to the method of the present invention, the virtual channel map (VCM) is extracted from the transport layer by the transport layer demultiplexer 336 and provided to a virtual channel map interpreter 348. A subscriber's service selection is also provided to the VCM interpreter 348 via line 346. As explained above, the subscriber's selection is in the form of a "virtual channel." To the subscriber, a "virtual channel" is simply the channel number displayed on the set-top decoder attached to the subscriber's television or displayed using a graphical user interface or some other device at the subscriber location. The VCM interpreter 348 receives the subscriber's "virtual channel" selection, and interprets the virtual channel map to determine which video, audio, teletext, closed-captioning and data services in the multiplex data stream are associated with that subscriber's virtual channel selection. A system operator can re-define the services associated with a given virtual channel by simply modifying the virtual channel map. Once the VCM interpreter 348 has determined which digital services in the multiplex data stream are associated with the subscriber's channel selection, it provides service ID's for each of those services to the service extractor 344. For example, a subscriber may select "channel 12" on the subscriber's television. The virtual channel map may indicate that "channel 12" corresponds to video service 3, audio service 2, and the closed-captioning data associated with video service 3. This information is transmitted to the service extractor 344 via line 354.

To facilitate extraction of the appropriate video service, the service extractor 354 receives the video multiplex control packets (VMCPs) for each field. As explained above, the VMCPs specify which bits in each video data packet (VDP) are allocated to each service. Thus, having received the service ID from the VCM interpreter 348 and the VMCP, the service extractor 344 is able to extract the bits for that video service from each VDP in the current field. The service extractor 344 also knows how many audio services are being carried in the multiplex, and therefore, knows the format of the audio service data. Recall that FIG. 6 illustrates the format of the audio service data for the case of twenty video services, and FIG. 7 illustrates the format for the case of 16 video services. Knowing this format, the service extractor 344 is able to extract the appropriate audio service. According to the preferred embodiment, the service extractor may extract up to four audio services per field. Closed-captioning data, if any, is extracted in a similar manner.

At this stage, the extracted video and audio services are still independently encrypted. As shown in FIG. 16, the video and audio services are passed to individual service decryptors 358 for decryption. The requisite encryption seeds are provided to the respective decryptors 358 via line 356. The extracted services are then output from the demultiplexer 298 via respective lines 359. In addition to video, audio and closed-captioning data, teletext data that has been retrieved from the teletext packets in the transport layer is output from the service demultiplexer 298 via line 362.

Figure 17:
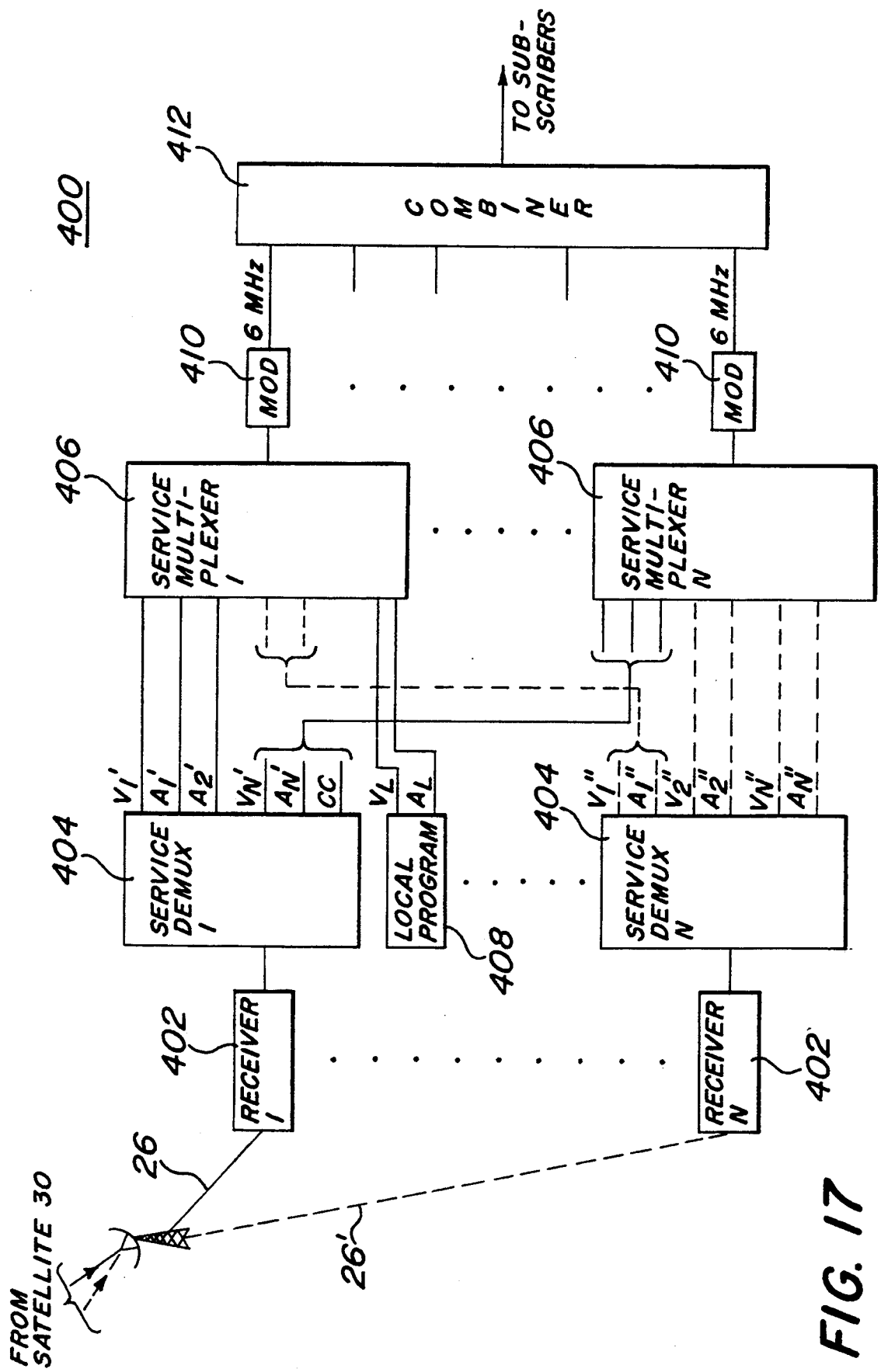
FIG. 17 is a block diagram of an alternate design of a cable head-end installation that may be employed in accordance with the system of the present invention.

FIG. 17 is a block diagram of an alternate design of a cable head-end installation 400 for use in the system of the present invention. The alternate cable head-end installation 400 allows cable operators to generate their own multiplex data streams using the services originally provided by various programmers as well as their own local programming. The cable head-end installation 400 comprises a plurality of receivers 402 each for receiving a multiplex data stream from a particular programmer (e.g. programmers 1 to N of FIG. 1). In the cable head-end installation 252 of FIG. 14, the multiplexed data streams received from the programmers were left intact and passed directly to subscribers via cable. As shown in FIG. 17, however, the alternate cable head-end installation 400 comprises a plurality of service demultiplexers 404 for extracting the individual services from each of the multiplexed data streams received at the installation 400. Each of the service demultiplexers 404 may be identical to the service demultiplexer 298 shown in FIG. 16. For each multiplex data stream received at the installation 400, a respective service demultiplexer 404 extracts the services carried in that multiplex data stream in accordance with the method described previously in connection with FIG. 16. Service multiplexers 406, which may be identical to the service multiplexers 24 of FIG. 1, are provided for re-multiplexing the extracted services. As shown, therefore, a cable operator may mix services from different programmers, and may add their own local programs, as illustrated at block 408. Each of the multiplex data streams generated by the service multiplexers 406 is then modulated on its own 6 MHz cable channel using modulators 410. The individually modulated data streams are then passed to a combiner 412 that combines them into a single wideband signal for transmission to cable subscribers via a cable distribution network. In these latter respects, the cable head-end installation 400 of FIG. 17 functions identically to the cable head-end installation 252 of FIG. 14.

Figure 18:
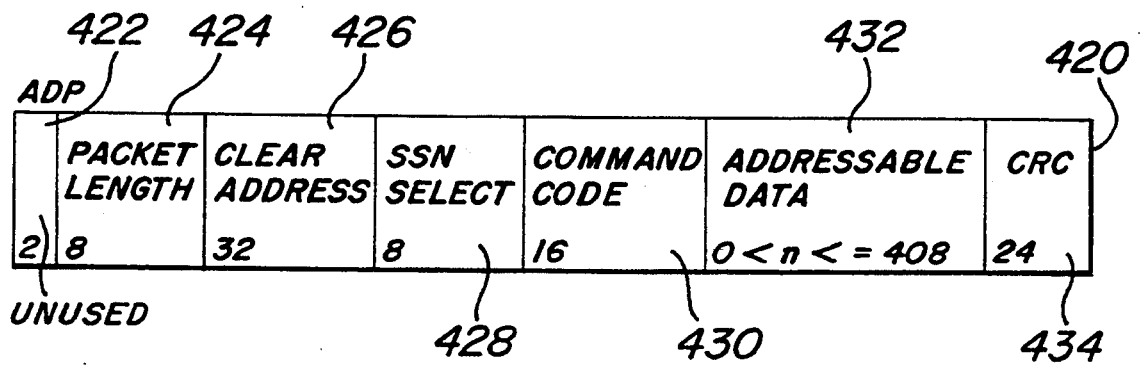
FIG. 18 shows in detail the general arrangement and contents of an addressable data packet that can be transmitted in a field of the multiplex data stream.

FIG. 18 shows the general arrangement and contents of an exemplary addressable data packet 420 (ADP). The small number in the lower left corner of each packet field indicates how many bits that field comprises. As shown, the first two bits of the ADP 420 are unused. A packet length field 424 contains the overall length of the packet in bits. Consequently, the packet length may be varied, as long as it does not exceed a single line in a given field of the multiplex data stream. A clear address field 426 contains the public address of the decoder to which the ADP is targeted. As explained above in connection with FIG. 16, the decoders provided at every subscriber location contain a unique public address that identifies that decoder, and the service demultiplexer (e.g. demultiplexer 298 of FIG. 16) in the decoder examines the clear address field 426 of all incoming ADPs and accepts those ADPs that contain the address of that particular decoder. In this manner, therefore, subscriber specific information may be transmitted to individual decoders. The address of a given decoder is set at the factory when the decoder is manufactured. A secret serial number (SSN) may also be stored in each decoder. The secret serial number can be used to encrypt the information carried in an ADP. A secret serial number select field 428 is provided for alerting the decoder as to whether the information in the ADP 420 is encrypted with the decoder's SSN. A command code field 430 holds a sixteen bit "command" that can be used to control a decoder. The upper six bits of the two byte code select a given "command set." The remaining ten bits specify the actual command. A data field 432 provides accompanying data for the command in the command field 430. This arrangement allows for 64 independent command sets with 1024 commands in each set. For example, a "command" may be transmitted in the command field 430 that tells the target decoder to store the information in the data field 432 in a memory at the decoder. A twenty-four bit CRC 434 follows at the end of the ADP 420 to ensure the accuracy of the information contained within the ADP 420. If a decoder detects an error in a given ADP, it discards the entire ADP.

Figure 19:
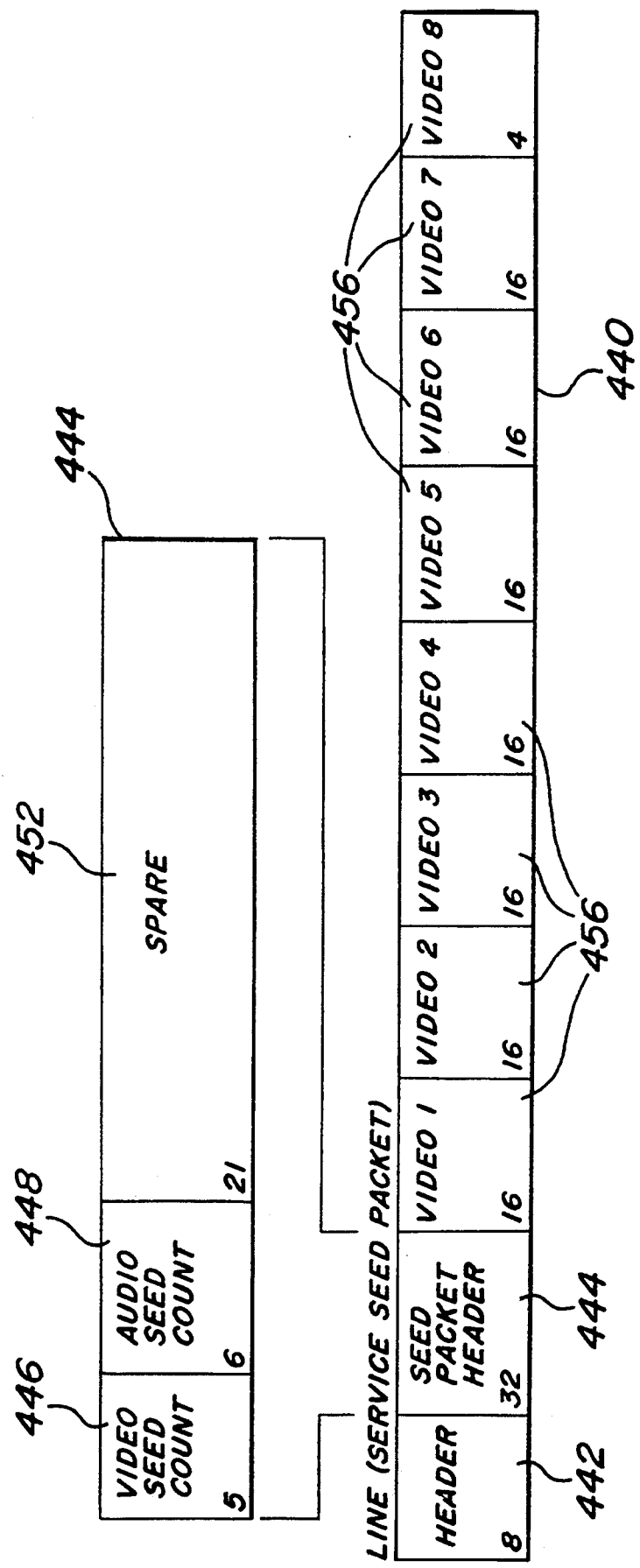
FIG. 19 shows in detail the general arrangement and contents of an exemplary first service seed packet that can be transmitted in a field of the multiplex data stream.

FIG. 19 shows the general arrangement and contents of a first service seed packet (SSP) 440 that must be transmitted in given cryptocycle of a multiplex data stream. As briefly described above, the individual service seeds used to encrypt the services during each cryptocycle are transmitted to subscriber locations so that the decoders at these locations can decrypt the extracted service data streams. Furthermore, the seeds used to encrypt service data in the fields of a given cryptocycle are transmitted one cryptocycle in advance of the encrypted service data so that the decoders have enough time to extract the seeds and prepare for decryption. In the preferred embodiment described herein, only video and audio services are encrypted. However, other services, such as utility data and teletext data may also be encrypted. Consequently, the exemplary system seed packet 440 (SSP) of FIG. 19 may be modified to provide for those cases.

As mentioned, FIG. 19 illustrates the arrangement and contents of a first SSP that must be transmitted during a given cryptocycle. Since the number of services carried in a multiplex data stream can vary, it is necessary to provide flexibility in the transmission of the service seeds. To this end, the first SSP 440 in a given cryptocycle contains a first header 442, identifying the packet as a service seed packet, and a seed packet header 444 that contains information concerning the number of seeds to follow. As shown, the seed packet header 444 contains a count for each type of service. As described above, a different seed is used to encrypt each service. Essentially, therefore, the seed packet header 444 specifies the number of each type of service carried in the multiplex. For example, a video seed count 446 provides a count of the number of video services carried in the multiplex data stream. With this information, the service demultiplexer in a given decoder knows how many video service seeds will follow. Similarly, an audio seed count 448 indicates the number of audio service seeds to follow. Twenty-one bits (i.e., field 452) are reserved for future use in the event that other types of services are encrypted. For example, if teletext data were to be encrypted, a count would be added to the seed packet header 444 indicating how many seeds would follow for that service.

Figure 20:
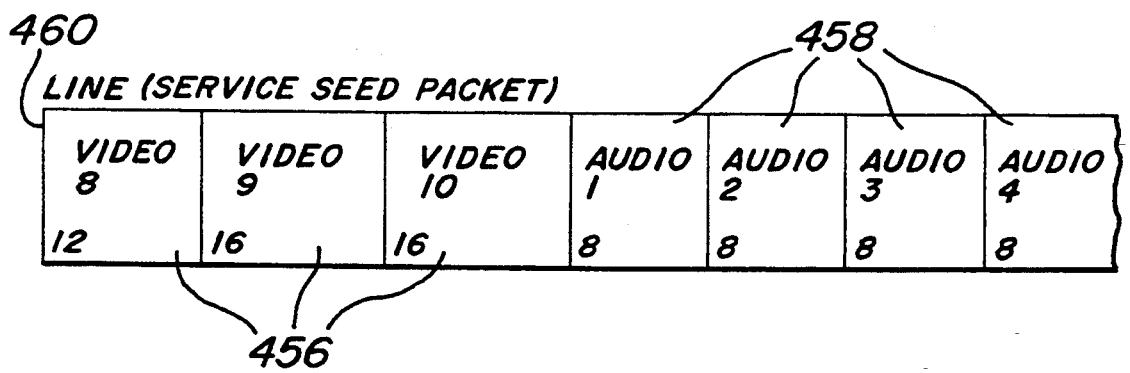
FIG. 20 shows in detail the general arrangement and contents of an exemplary service seed packet that may be transmitted subsequent to the service seed packet shown in FIG. 19.

After the seed packet header, the remainder of the first packet 440 contains the actual seed values. As shown, the seeds are simply provided consecutively by service type. If all the required seeds do not fit within the first seed packet, another seed packet may be provided on a subsequent line. FIG. 20 illustrates an exemplary seed packet that would follow on the next line of a given field of the multiplex and would carry the remainder of the seeds. In the example shown in FIGS. 19 and 20, there are 10 video services being carried in the multiplex. Consequently, the video seed count 446 in the seed packet header 444 of the first SSP 440 will indicate that 10 video service seeds are to follow. As shown, only eight of the video service seeds fit within the first SSP 440. The video service seeds are arranged consecutively within the SSP and are shown generally at 456 in FIG. 19. FIG. 20 illustrates the contents and arrangement of a subsequent SSP that preferably will be transmitted on the line immediately following the line containing the first SSP 440 of FIG. 19. As shown, the remaining video service seeds (e.g., seeds for video services 8 thru 10) are arranged consecutively within the subsequent SSP 460 followed by the seeds for the audio services, and so on. Additional SSPs may be transmitted as needed until all the seeds required for service decryption have been transmitted. It should be noted that alternate seed generation methods may be used to reduce the overall amount of encryption related information that must be transmitted in the SSPs.

Figure 21:
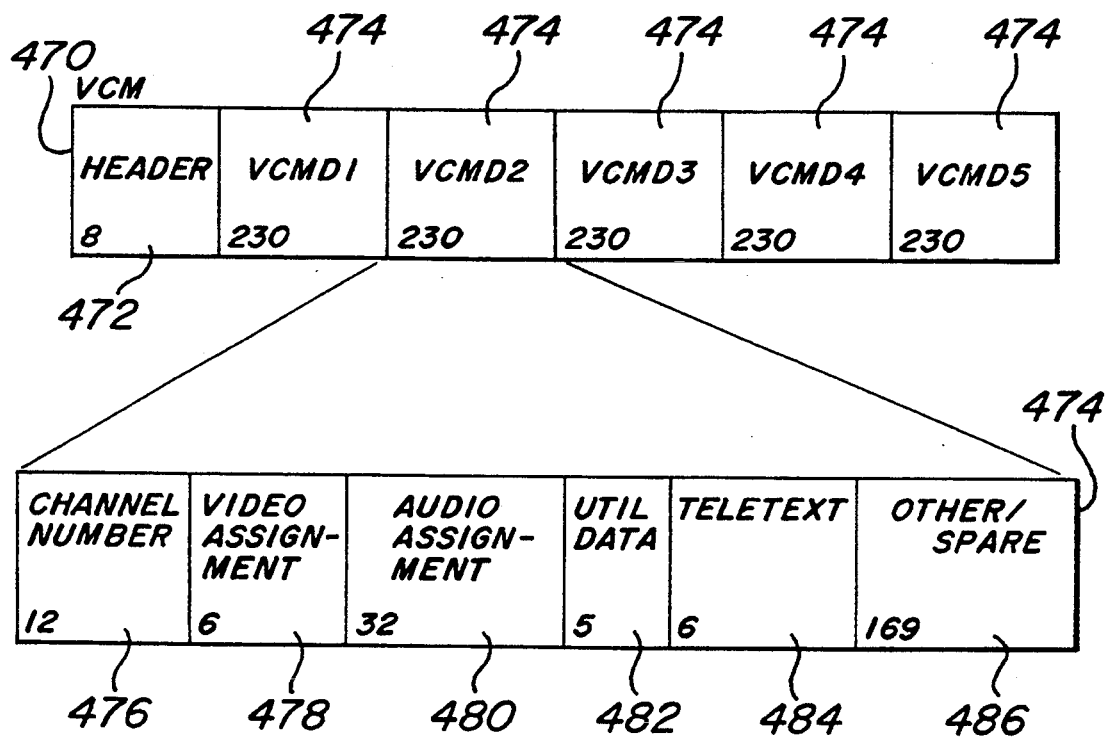
FIG. 21 shows in detail the general arrangement and contents of a virtual channel map packet that can be transmitted in a field of the multiplex data stream.

FIG. 21 shows the general arrangement and contents of a virtual channel map packet. As explained above, the virtual channel map associates a subscriber's "TV channel" selection with various services in the multiplex. The service demultiplexer in each subscriber's decoder interprets the virtual channel map to determine which services (e.g., video, audio, closed-captioning etc) are associated with the subscriber's channel selection, and then extracts those services from the multiplex data stream. As shown in FIG. 21, a virtual channel map packet 470 comprises a header 472, which identifies the packet as a VCM packet, followed by a plurality of virtual channel definitions 474 which, in the preferred embodiment, are each 230 bits long. A VCM packet, such as packet 470, contains up to five virtual channel definitions 474 (labeled VCMD1 . . . VCMD5). Each definition comprises a channel number field 476 that specifies the particular virtual channel number being defined, i.e., the number that a subscriber would select at the subscriber location. Next, a video assignment field 478 specifies which video service in the multiplex data stream corresponds to that virtual channel number. Similarly, audio, utility data, and teletext data assignments are specified in fields 480, 482 and 484 respectively. As can be seen, virtual channel map definitions allow a great degree of flexibility in defining the associations between a subscriber's "virtual channel" selection and various services within the multiplex data stream. A spare field 486 is provided for future service definitions.

Figure 22:
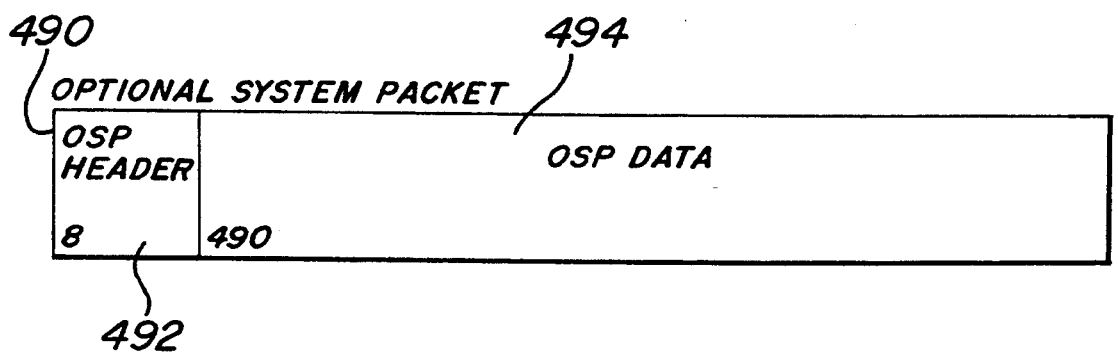
FIG. 22 shows in detail the general arrangement and contents of an optional system packet that can be transmitted in a line of the multiplex data stream.

FIG. 22 shows the general arrangement and contents of an optional system packet that can be transmitted in a line of the multiplex data stream. As shown, an optional system packet 490 comprises an OSP header 492 and an OSP data field 494. Optional system packets may contain a wide variety of system related information, and as the name implies, are optional.

As explained herein, the system related packets, such as SDP, SSPs, VMCPs, VCMs etc., must be transmitted each cryptocycle. Because these types of packets are too numerous to transmit in a single field, they are transmitted over one or more of the fields in a cryptocycle. Thus, cryptocycles define fixed boundaries in the multiplex data stream 26 within which a complete set of system related data is transmitted. FIG. 23 illustrates an exemplary cryptocycle. More particularly, FIG. 23 shows the contents of the transport layers (i.e., first thirteen lines) of the eight consecutive fields in the exemplary cryptocycle. The example shown assumes more than 10 video services are being transmitted, and therefore, two video multiplex control packets (VMCPs) are transmitted with every field. In fields 1, 2 and 4–8, the VMCPs are transmitted on lines 3 and 4 of those fields, whereas in field 3, the VMCPs are transmitted on lines 11 and 12. Recall that the multiplex map transmitted at the beginning of each field specifies the number and location of each of the types of packets transmitted within the transport layer of a given field. In the example shown, the virtual channel map definitions are transmitted with fields 1 and 2. Service seeds packets are all transmitted in field 3. As mentioned, service seeds are transmitted one cryptocycle in advance of the data they were used to encrypt so that the decoder has sufficient time to prepare for decryption. It is desirable therefore to transmit service seed packets as early in a cryptocycle as possible. The remaining fields, 4 through 8, of the exemplary cryptocycle of FIG. 23 are used for transmitting teletext data (TT) and addressable data packets (ADPs), as shown. Those skilled in the art will appreciate that the type and number of packets transmitted in a given field is entirely flexible; the multiplex map can be modified on a per field basis to uniquely define the contents of the transport layer of each field.

Figure 24:
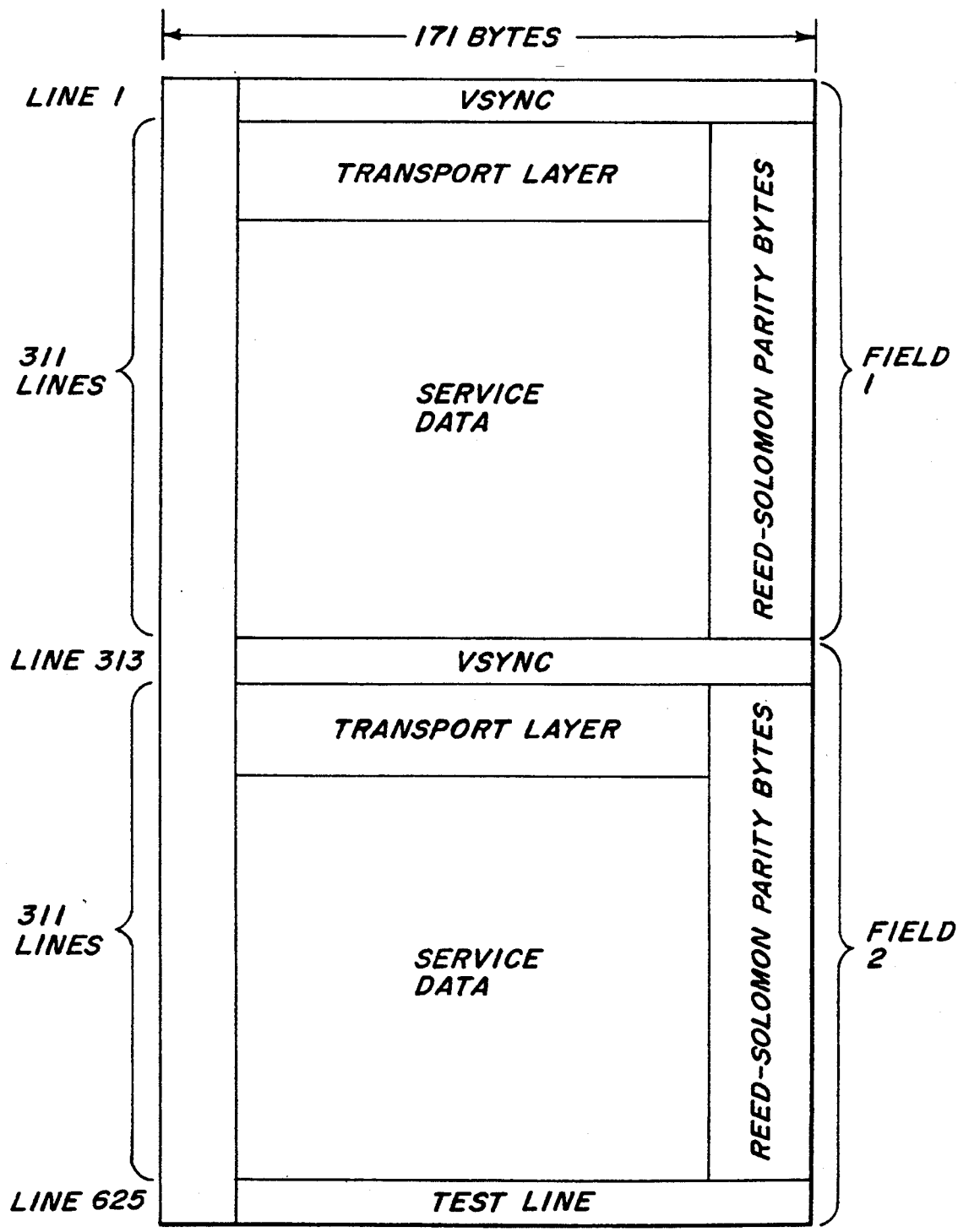
FIG. 24 shows in detail the general arrangement and contents of a frame of the multiplex data stream of FIG. 2 for transmitting PAL video services in accordance with the present invention.

As has been described throughout the specification, the general arrangement and contents of a frame of the multiplex data stream (and each of its fields) is dependent upon the analog video format being employed at subscriber locations. FIGS. 3 through 5 illustrate the arrangement of a frame of the multiplex data stream for use with NTSC compatible video equipment. FIG. 24 shows the general arrangement and contents of a frame of the multiplex data stream for use with PAL video equipment. The frame is virtually identical to the NTSC based frame, except that when PAL video equipment is being used at subscriber locations, the frame has 625 lines. As those skilled in the art will appreciate, 625 lines corresponds to the number of lines in the analog PAL video format. As explained, according to the system of the present invention, each line (i.e., 171 bytes) of every frame is transmitted at the horizontal line frequency of the particular analog video format being employed at subscriber locations. For PAL video, the horizontal line frequency $F_h$ is 15.625 kHz. Accordingly, the overall multiplex data rate will be:

$$1368 \text{ bits} \times 15.625 \text{ kHz} = 21.375 \text{ Mbps}.$$

The overall frame rate will be:

$$\frac{15,625 \text{ lines}}{\text{second}} \times \frac{1 \text{ Frame}}{625 \text{ lines}} = 25 \text{ frame/s}.$$

As expected, 25 frames/s is equal to the analog PAL video frame rate. Although the transmission rate of the multiplex data stream for use with PAL compatible video equipment is slightly different than the rate used for NTSC equipment, those skilled in the art will appreciate that the hardware design of the system of the present invention is essentially the same for both formats; the only difference being that a different system clock must be employed in order to generate the appropriate clock frequencies used throughout the system.

Figure 25:
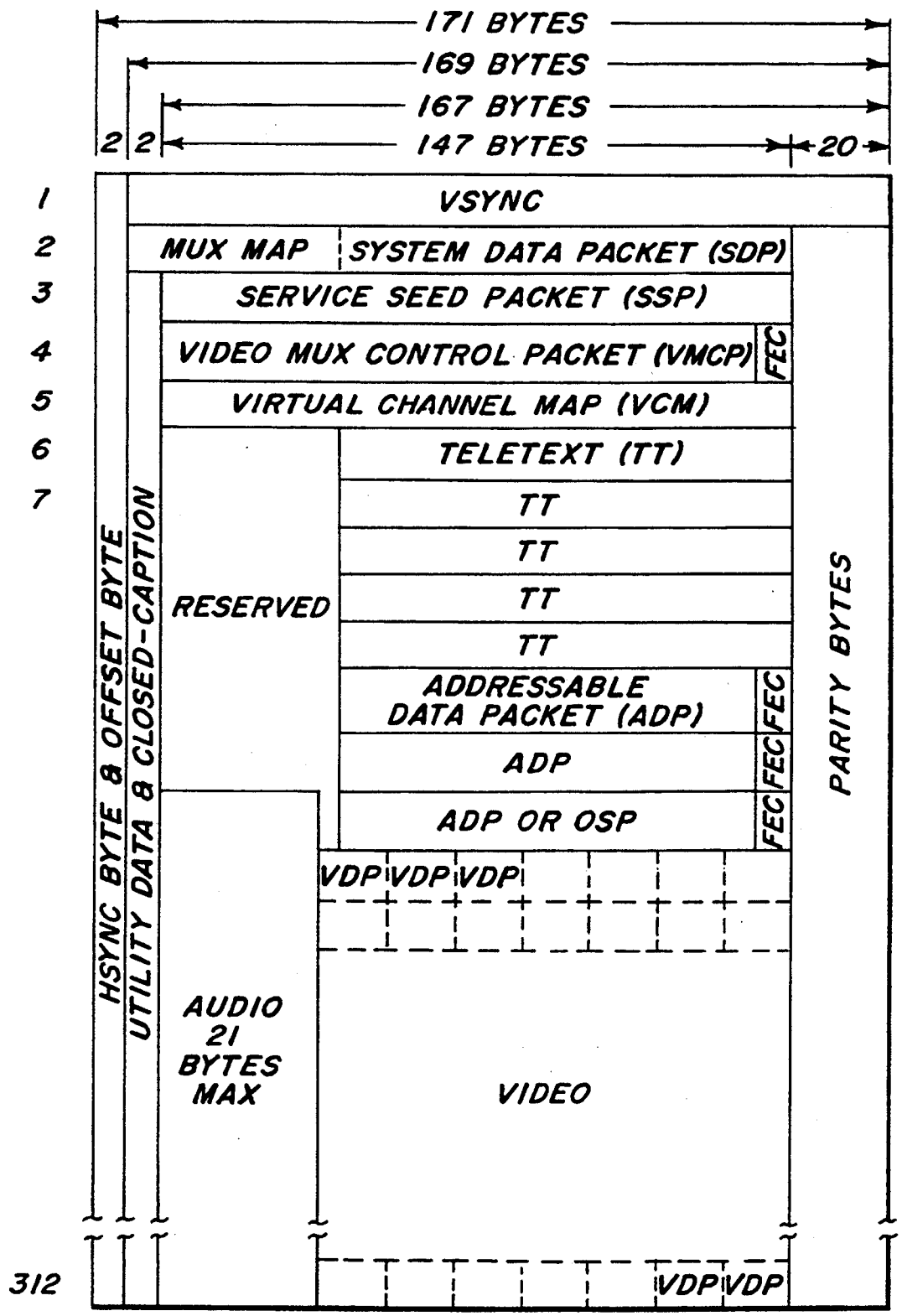
FIG. 25 shows in detail the data and services that can be carried in an exemplary first field of the frame of FIG. 24.
Figure 26:
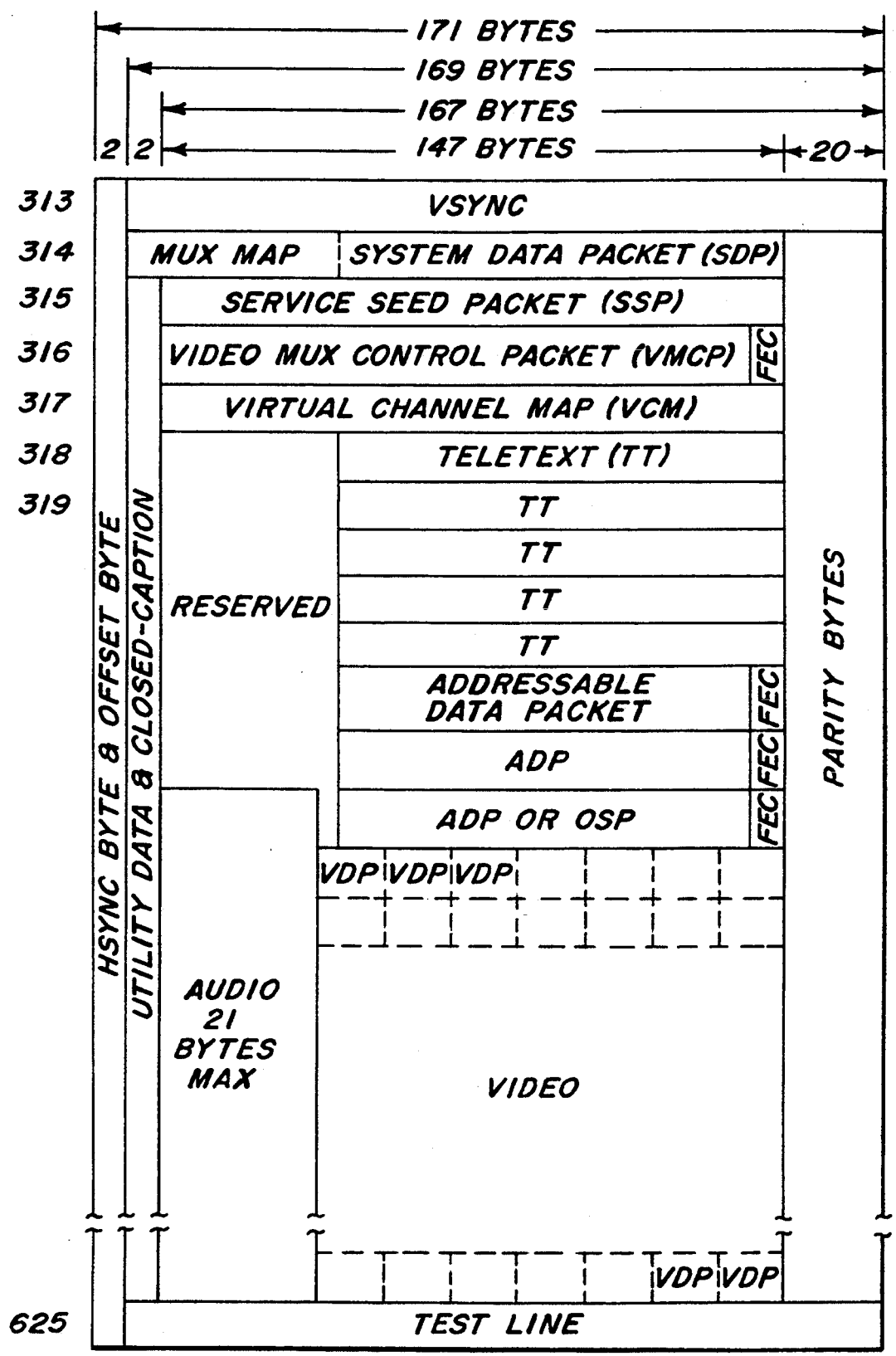
FIG. 26 shows in detail the data and services that can be carried in an exemplary second field of the frame of FIG. 24.

FIGS. 25 and 26 illustrate further details of each field of the frame of FIG. 24. As can be seen, the general arrangement and contents of the fields shown in FIGS. 25 and 26 for the case of PAL video are essentially identical to the arrangement and contents of the fields shown in FIG. 4 and 5 for the case of NTSC video. The only difference is the number of lines in each field.

Figure 27:
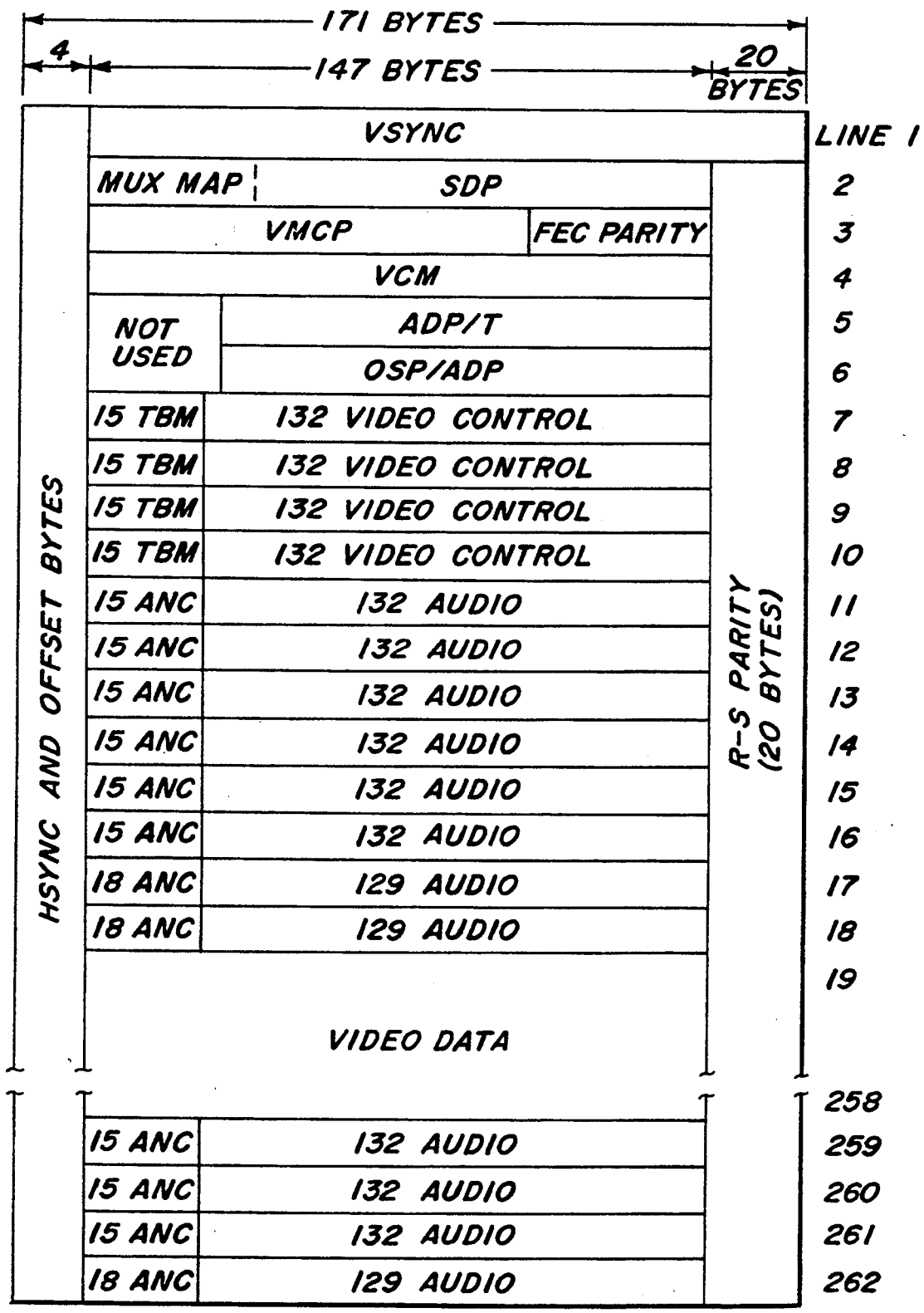
FIG. 27 shows in detail the general arrangement and contents of a frame of the multiplex data stream of FIG. 2 for transmitting an HDTV video service in accordance with the present invention.

Because of the flexibility provided by the method of the present invention, namely the use of a multiplex map to define the contents of each field on a per field basis, the system of the present invention is capable of carrying HDTV format signals as well. Recall that an HD select field (see FIG. 11) is provided in the multiplex map for indicating whether a given field is carrying an HDTV service. FIG. 27 shows in detail the general arrangement and contents of a field of the multiplex data stream for carrying a Zenith/AT&T DSC format HDTV signal. HDTV formats naturally require a higher data rate than normal NTSC video data, and therefore, only one HDTV service can be carried in a single multiplex data stream. Because only one service is being transmitted, the number and types of data packets in the transport layer of each field can be reduced. As shown in FIG. 2, when the Zenith/AT&T DSC-HDTV format is being carried, the transport layer may comprise a maximum of five lines of each field after the VSYNC word. Other HDTV formats may alter the amount of lines that can be used for transport layer information.

As can be seen from FIG. 27, the HSYNC and offset byte are the same whether transporting HDTV, NTSC or PAL compatible video services. A main difference in the HDTV based field depicted in FIG. 27, however, is the manner in which audio services are provided within the field. Most HDTV format definitions specify how audio data is to be carried. FIG. 27 illustrates how audio is carried in the Zenith/AT&T DSC format.

As the foregoing illustrates, the present invention comprises a system and method for transmitting a plurality of digital services to a plurality of remote locations. Great flexibility is achieved by allocating portions of each field of the multiplex data stream to the various services and by transmitting a multiplex map with each field that specifies how the data space within the field is allocated. With the multiplex map, the amount of system overhead carried within each field of the multiplex data stream may be tailored to the particular number of services being carried. In addition, according to another aspect of the system and method of the present invention, data rates within the system are related to corresponding analog video frequencies of the analog video equipment being used with the system. The relation to analog video frequencies simplifies hardware design in that standard analog video circuitry may easily be employed in the decoders at each subscriber location and all clock frequencies required throughout the system, including digital and analog frequencies, may be derived from a base frequency using suitable phase-lock-loops and frequency dividers and multipliers. It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. In a communications system, a method of transmitting a plurality of digital services from an origination point to at least one remote location, said method comprising the steps of:

(a) multiplexing said plurality of digital services in a time-division manner to form a multiplexed data stream, said multiplexed data stream having a format comprising a continuous sequence of fields, the locations of the multiplexed data of said digital services within each field being different for at least one of said fields;

(b) generating, for each field, multiplex location data that specifies the locations of the multiplexed data of said digital services within that field, and inserting the multiplex location data in the multiplex data stream at predetermined positions within that field; and (c) transmitting successive fields of the multiplex data stream to at least one remote location, whereby the locations of the multiplexed data of said digital services within each field may vary from field to field and the multiplex location data within each field may be employed at the remote location to determine the locations of the multiplexed data within each field.

2. A method according to claim 1 wherein each digital service has a respective data rate, and wherein the portion of each field at which the multiplexed data of said digital services is located defines a service data region of that field, and further wherein step (a) comprises allocating different portions of the service data region of each field to different ones of the digital services in proportion to the respective data rates of each service.

3. A method according to claim 2 further comprising the step of adjusting the size of the portions of the service data regions allocated to a particular service.

4. A method according to claim 2 wherein at least some of said digital services comprise digital video services, and further wherein a portion of said service data region of each field comprises a video portion, different bits of the video portion of each field being allocated to different ones of said digital video services.

5. A method according to claim 4 further comprising performing the following additional steps for each field:

(i) generating at least one video multiplex control packet that specifies which bits in the video portion of the field are allocated to which digital video services; and (ii) inserting said at least one video multiplex control packet in said field prior to transmitting that field of the multiplex data stream in step (c), the multiplex location data generated for said field specifying the locations of said at least one video multiplex control packet within said field.

6. A method according to claim 5 wherein the video portion of each field comprises a plurality of video data packets each comprising a same number of bits, different portions of each video data packet being allocated to different ones of said digital video services, the allocation of bits within each video data packet of a particular field being the same, said at least one video multiplex control packet in each field specifying which bits in each video data packet of that field are allocated to which of said digital video services.

7. A method according to claim 1 wherein some of said digital services are video services to be transformed at said remote location into an analog video format, and wherein the format of each field of the multiplex data stream is related to a corresponding analog field format of said analog video format.

8. A method according to claim 1 wherein each field of the multiplex data stream comprises a plurality of successive lines each containing a predetermined number of bits, and wherein step (c) comprises transmitting successive lines of each field at a rate substantially equal to a horizontal line frequency of an analog video format.

9. A method according to claim 1 wherein each field begins with a field synchronization word (VSYNC) and wherein step (b) comprises inserting the multiplex location data for each field after the field synchronization word.

10. A method according to claim 1 wherein step (a) further comprises inserting a plurality of different types of system related packets at different locations within selected fields of the multiplexed data stream, and wherein the multiplex location data generated for each field specifies the locations of each of the different types of system related packets contained in that field.

11. A method according to claim 10 wherein the system related packets comprise at least one of the following types: system data packets (SDPs), addressable data packets (ADPs), virtual channel map packets (VCMPs), service seed packets (SSPs), teletext packets (TTs) and video multiplex control packets (VMCPs), and further wherein the number and types of system related packets contained in said fields may differ from field to field.

12. A method according to claim 10 wherein the multiplex location data inserted in each field comprises a multiplex map that specifies the number of each of the different types of system related packets contained in that field.

13. In a communications system, a method of transmitting a plurality of digital services and a plurality of different types of system related packets from an origination point to at least one remote location, said method comprising the steps of:

(a) multiplexing said digital services and said system related packets in a time-division manner to form a multiplexed data stream having a format comprising a continuous sequence of fields, one portion of each field containing selected ones of said different types of system related packets and remaining portions of each field containing multiplexed data of said plurality of digital services, the locations of the system related packets and the multiplexed data of said digital services within each field being different for at least one of said fields;

(b) for each field, (i) generating multiplex location data that specifies the locations of each type of system related packet contained in that field and specifies the locations of the multiplexed data of said digital services within the field, and (ii) inserting the multiplex location data at pre-determined positions within that field; and (c) transmitting successive fields of the multiplex data stream to at least one remote location.

14. A method according to claim 13 wherein the number and types of system related packets may vary from field-to-field, and wherein the multiplex location data generated for each field in step (b) comprises a multiplex map that specifies the number and locations of each of the different types of system related packets inserted in that field.

15. A method according to claim 14 wherein the system related packets comprise at least one of the following different types: system data packets (SDPs), addressable data packets (ADPs), virtual channel map packets (VCMPs), service seed packets (SSPs), and teletext packets (TTs).

16. A method according to claim 13 wherein each of said plurality of digital service has a respective data rate, and wherein the portion of each field containing the multiplexed data of said digital services defines a service data region of that field, and further wherein step (a) includes allocating different portions of the service data region of each field to different ones of the digital services in proportion to the respective data rates of each service.

17. A method according to claim 16 further comprising the step of adjusting the size of the portions of the service data regions allocated to a particular service.

18. A method according to claim 16 wherein some of said digital services comprise digital video services, and further wherein a portion of said service data region of each field comprises a video portion, different bits of the video portion of each field being allocated to different ones of said digital video services.

19. A method according to claim 18 further comprising performing the following additional steps for each field:
(i) generating at least one video multiplex control packet that specifies which bits in the video portion of the field are allocated to which digital video services; and
(ii) inserting said at least one video multiplex control packet in said field prior to transmitting that field of the multiplex data stream in step (c), the multiplex location data generated for said field specifying the locations of said at least one video multiplex control packet within said field.

20. A method according to claim 19 wherein the video portion of each field comprises a plurality of video data packets each comprising a same number of bits, different portions of each video data packet being allocated to different ones of said digital video services, the allocation of bits within each video data packet of a particular field being the same, said at least one video multiplex control packet in each field specifying which bits in each video data packet of that field are allocated to which of said digital video services.

21. A method according to claim 13 wherein at least one of said digital services comprises a digital video service to be converted at said remote location into an analog video format, and wherein the format of each field of the multiplex data stream is related to a corresponding analog field format of said analog video format.

22. A method according to claim 13 wherein at least one of said digital services comprises a digital video service to be converted at the remote location into an analog video format, and wherein each field of the multiplex data stream comprises a plurality of successive lines each containing a pre-determined number of bits, and further wherein step (c) comprises transmitting successive lines of each field at a rate substantially equal to a horizontal line frequency of said analog video format.

23. A method according to claim 13 wherein each field begins with a field synchronization word (VSYNC), and wherein step (b)(ii) comprises inserting the multiplex location data for each field after the field synchronization word.

24. A method of demultiplexing a multiplexed data stream received at a remote location, wherein said multiplexed data stream contains multiplexed data of a plurality of digital services and has a format comprising a plurality of fields wherein the locations of the multiplexed data of said digital services within each field may differ from field to field, each field containing multiplex location data that specifies the locations of the multiplexed data of said digital services within that field, said method comprising the steps of:
(a) receiving successive fields of the multiplex data stream at the remote location; and
(b) for each successive field:
(i) extracting the multiplex location data from the field and identifying, based at least in part upon information contained therein, the locations within that field of the multiplexed data of said digital services; and
(ii) extracting from the field the data of a selected one of said digital services.

25. A method according to claim 24 wherein each field of the multiplexed data stream further contains a plurality of different types of system related packets and the locations of the system related packets within each field may vary from field to field, the multiplex location data in each field specifying the number and locations of each type of system related packet in that field, step (b) further comprising locating and extracting the system related packets contained in each field based upon information contained in the multiplex location data of each respective field.

26. A method according to claim 24 wherein at least some of said digital services comprise digital video services, the data of said digital video services being located within a video portion of each field, different bits of the video portion of each field being allocated to different ones of the digital video services, each field further containing at least one video multiplex control packet that specifies which bits of the video portion of that field are allocated to which digital video services, the multiplex location data in each field specifying the locations of said at least one video multiplex control packet with the field, said method of decoding further comprising the steps of, for each field:
(c) locating said at least one video multiplex control packet in the field based upon information contained in the extracted multiplex location data for that field; and
(d) identifying from the video multiplex control packet which bits of the video portion of the field are allocated to a selected one of the digital video services.

27. A method of demultiplexing a multiplexed data stream received at a remote location, wherein said multiplexed data stream contains multiplexed data of a plurality of digital services and a plurality of different types of system related packets, and wherein said multiplexed data stream has a format comprising a continuous sequence of fields, one portion of each field containing selected ones of said different types of system related packets and a remaining portion of each field containing multiplexed data of said plurality of digital services, the locations of the system related packets and the multiplexed data of said digital services within each field being different for at least one of said fields, each field containing multiplex location data that specifies the locations of each type of system related packet contained in that field and the locations of the multiplexed data of said digital services with that field, said method of demultiplexing comprising the steps of:

(a) receiving successive fields of the multiplex data stream at the remote location; and
(b) for each successive field:
  (i) extracting the multiplex location data from said field; and
  (ii) locating and extracting the system related packets and the multiplexed data of a selected digital service from the field based upon information contained in the extracted multiplex location data.

28. A method according to claim 27 wherein at least some of said digital services comprise digital video services, the data of said digital video services being located within a video portion of each field, different bits of the video portion of each field being allocated to different ones of the digital video services, each field further containing at least one video multiplex control packet that specifies which bits of the video portion of that field are allocated to which digital video services, the multiplex location data in each field specifying the locations of said at least one video multiplex control packet with the field, said method of decoding further comprising the steps of, for each field:
  (c) locating the video multiplex control packet in the field based on information contained in the extracted multiplex location data for that field; and
  (d) identifying from the video multiplex control packet which bits of the video portion of the field are allocated to a selected one of the digital video services.

29. An encoder apparatus for multiplexing a plurality of digital services for transmission from an origination point to at least one remote location in a communications system, said encoder apparatus comprising:
  multiplexer means for multiplexing said plurality of digital services in a time-division manner to form a multiplexed data stream, said multiplexed data stream having a format comprising a continuous sequence of fields, the locations of the multiplexed data of said digital services within each field being different for at least one of said fields;
  means for generating, for each field, multiplex location data that specifies the locations of the multiplexed data of said digital services within that field;
  means coupled to the multiplexer means for inserting the multiplex location data of each field in the multiplex data stream at pre-determined positions within each respective field; and
  a transmitter coupled to the multiplexer means for transmitting successive fields of the multiplex data stream to at least one remote location.

30. An encoder apparatus according to claim 29 wherein each digital service has a respective data rate, and wherein the portion of each field at which the multiplexed data of said digital services is located defines a service data region of that field, and further wherein the multiplexer means allocates different portions of the service data region of each field to different ones of the digital services in proportion to the respective data rates of each service.

31. An encoder apparatus according to claim 30 wherein the multiplexer means is adapted to adjust the size of the portions of the service data regions allocated to a particular service.

32. An encoder apparatus according to claim 30 wherein at least some of said digital services comprise digital video services, and wherein a portion of said service data region of each field generated by said multiplexer means comprises a video portion, said multiplexer means being operative to allocate different bits of the video portion of each field to different ones of said digital video services.

33. An encoder apparatus according to claim 32 further comprising means for generating, for each field, at least one video multiplex control packet that specifies which bits in the video portion of the field are allocated to which digital video services and for inserting said at least one video multiplex control packet in the field, the multiplex location data generated for each field specifying the locations of each video multiplex control packet within that field.

34. An encoder apparatus according to claim 33 wherein the video portion of each field generated by said multiplexer means comprises a plurality of video data packets each comprising a same number of bits, said multiplexer means allocating different portions of each video data packet to different ones of said digital video services, the allocation of bits within each video data packet of a particular field being the same, said at least one video multiplex control packet generated and inserted in each field specifying which bits in each video data packet of that field are allocated to which of said digital video services.

35. An encoder apparatus according to claim 29 wherein each field generated by the multiplexer means comprises a plurality of successive lines each containing a pre-determined number of bits, and wherein the transmitter is operative to transmit successive lines of each field at a rate substantially equal to a horizontal line frequency of an analog video format.

36. An encoder apparatus according to claim 29 wherein the multiplexer means is adapted to insert a field synchronization word (VSYNC) at the beginning of each field and to insert the multiplex location data for each field after the field synchronization word.

37. An encoder apparatus according to claim 29 wherein the multiplexer means is further operative to insert a plurality of different types of system related packets at different locations within selected fields of the multiplexed data stream, and wherein the multiplex location data generated for each field specifies the locations of each type of system related packet inserted in that field.

38. An encoder apparatus according to claim 37 wherein the multiplex location data inserted in each field comprises a multiplex map that specifies the number of each of the different types of system related packets contained in that field.

39. An encoder apparatus according to claim 37 wherein the system related packets comprise at least one of the following types: system data packets (SDPs), addressable data packets (ADPs), virtual channel map packets (VCMPs), service seed packets (SSPs), teletext packets (TTs) and video multiplex control packets (VMCPs).

40. An encoder apparatus for multiplexing a plurality of digital services and a plurality of different types of system related packets for transmission from an origination point to at least one remote location in a communications system, said encoder apparatus comprising:
  multiplexer means for multiplexing said digital services and said system related packets in a time-division manner to form a multiplexed data stream having a format comprising a continuous sequence of fields, one portion of each field containing selected ones of said different types of system related packets and a remaining portion of each field containing multiplexed data of said plurality of digital services, the locations of the system related packets and the multiplexed data of said digital services within each field being different for at least one of said fields;

means for generating, for each field, multiplex location data that specifies the locations of each type of system related packet contained in that field and that specifies the locations of the multiplexed data of said digital services within that field;

means coupled to the multiplexer means for inserting the multiplex location data for each field in the multiplex data stream at pre-determined positions within the respective fields; and a transmitter coupled to the multiplexer means for transmitting successive fields of the multiplex data stream to at least one remote location.

41. An encoder apparatus according to claim 40 wherein the number and types of system related packets may vary from field-to-field, and wherein the multiplex location data generated for each field comprises a multiplex map that specifies the number and locations of each of the different types of system related packets carried in that field.

42. An encoder apparatus according to claim 41 wherein the system related packets comprise at least one of the following types: system data packets (SDPs), addressable data packets (ADPs), virtual channel map packets (VCMPs), service seed packets (SSPs), and teletext packets (TTs).

43. An encoder apparatus according to claim 40 wherein each of said plurality of digital services has a respective data rate, and wherein the portion of each field containing the multiplexed data of said digital services defines a service data region of that field, and further wherein the multiplexer means allocates different portions of the service data region of each field to different ones of the digital services in proportion to the respective data rates of each service.

44. An encoder apparatus according to claim 43 herein the multiplexer means is adapted to adjust the size of the portions of the service data regions allocated to a particular service.

45. An encoder apparatus according to claim 43 wherein some of said digital services comprise digital video services, and wherein a portion of said service data region of each field comprises a video portion, said multiplexer means allocating different bits of the video portion of each field to different ones of said digital video services.

46. An encoder apparatus according to claim 45 further comprising means for generating, for each field, at least one video multiplex control packet that specifies which bits in the video portion of the field are allocated to which digital video services and for inserting said at least one video multiplex control packet in the field, the multiplex location data generated for each field specifying the number and locations of each video multiplex control packet within that field.

47. An encoder apparatus according to claim 46 wherein the multiplexer means constructs the video portion of each field from a plurality of video data packets each comprising a same number of bits, the multiplexer means allocating different portions of each video data packet to different ones of said digital video services, the allocation of bits within each video data packet of a particular field being the same, said at least one video multiplex control packet in each field specifying which bits in each video data packet of that field are allocated to which of said digital video services.

48. An encoder apparatus according to claim 40 wherein at least one of said digital services comprises a digital video service to be converted at the remote location into an analog video format, and wherein each field generated by the multiplexer means comprises a plurality of successive lines each containing a pre-determined number of bits, and wherein the transmitter is operative to transmit successive lines of each field at a rate substantially equal to a horizontal line frequency of said analog video format.

49. An encoder apparatus according to claim 40 wherein the multiplexer means is adapted to insert a field synchronization word (VSYNC) at the beginning of each field, and to insert the multiplex location data for each field after the field synchronization word.

50. A decoder apparatus for demultiplexing a multiplexed data stream containing multiplexed data of a plurality of digital services and having a format comprising a plurality of fields wherein the locations of the multiplexed data of said digital services within each field may differ from field to field, each field containing multiplex location data located at pre-determined positions therein that specifies the locations of the multiplexed data of said digital services within that field, said decoder apparatus comprising:

a receiver for receiving successive fields of the multiplex data stream;

first means coupled to the receiver for extracting the multiplex location data from a received field and for identifying, based at least in part upon information contained therein, the locations within that field of the multiplexed data of said digital services; and second means coupled to the receiver and to the first means for extracting from each field the data of a selected one of said digital services.

51. A decoder apparatus according to claim 50 wherein each field of the multiplexed data stream further contains a plurality of different types of system related packets and the locations of the system related packets within each field may vary from field to field, the multiplex location data in each field specifying the number and locations of each type of system related packet in that field, said decoder apparatus further comprising means for locating and extracting the system related packets contained in a field based upon information contained in the multiplex location data extracted from that field.

52. A decoder apparatus according to claim 50 wherein at least some of said digital services comprise digital video services, the data of said digital video services being located within a video portion of each field, different bits of the video portion of each field being allocated to different ones of the digital video services, each field further containing at least one video multiplex control packet that specifies which bits of the video portion of that field are allocated to which digital video services, the multiplex location data in each field specifying the locations of said at least one video multiplex control packet with the field, said decoder apparatus further comprising:

means for locating and extracting said at least one video multiplex control packet in a received field based on information contained in the extracted multiplex location data for that field; and demultiplexer means responsive to said at least one video multiplex control packet for extracting the bits of a selected one of the digital video services from the video portion of the received field.

* * * * *